United States Patent
Irwin et al.

(10) Patent No.: US 7,262,389 B2
(45) Date of Patent: Aug. 28, 2007

(54) HEAT SEAL APPARATUS, BAG MACHINE, AND BAG EDGE FORMING APPARATUS WITH RESILIENT TUBULAR ANVIL

(75) Inventors: Jere F. Irwin, P.O. Box 10668, Yakima, WA (US) 98909-1668; Dale L. Vantrease, Selah, WA (US)

(73) Assignee: Jere F. Irwin, Yakima, WA (US)

( * ) Notice: Subject to any disclaimer, the term of this patent is extended or adjusted under 35 U.S.C. 154(b) by 0 days.

(21) Appl. No.: 10/869,233

(22) Filed: Jun. 15, 2004

(65) Prior Publication Data

US 2004/0256373 A1    Dec. 23, 2004

Related U.S. Application Data

(60) Provisional application No. 60/480,339, filed on Jun. 19, 2003, provisional application No. 60/480,144, filed on Jun. 20, 2003.

(51) Int. Cl.
*B65B 51/14* (2006.01)
*B30B 5/04* (2006.01)
*H05B 1/02* (2006.01)

(52) U.S. Cl. ................... 219/243; 156/251; 156/583.1; 156/583.3; 53/370.7; 53/374.2

(58) Field of Classification Search ............... 219/243; 156/515, 583.1–583.3, 251; 53/329.3, 370.7, 53/373.7, 374.2, 375.9, 377.7

See application file for complete search history.

(56) References Cited

U.S. PATENT DOCUMENTS

| 1,905,366 | A |   | 4/1933  | Carlin |
|-----------|---|---|---------|--------|
| 2,466,735 | A | * | 4/1949  | Piazze ........................ 156/498 |
| 2,589,756 | A | * | 3/1952  | Waters ....................... 100/325 |
| 2,698,273 | A | * | 12/1954 | Miner et al. ................ 156/282 |
| 3,157,553 | A |   | 11/1964 | Spallina ..................... 156/515 |
| 3,334,004 | A | * | 8/1967  | Faust et al. ................. 156/499 |
| 3,393,291 | A | * | 7/1968  | Tucker ....................... 219/243 |
| 3,409,494 | A | * | 11/1968 | Korzinek .................... 156/515 |
| 3,415,704 | A |   | 12/1968 | Bate .......................... 156/515 |
| 3,496,049 | A | * | 2/1970  | Anderson ................... 156/497 |
| 3,553,059 | A | * | 1/1971  | Stohlquist ................... 156/515 |
| 3,574,039 | A |   | 4/1971  | Fehr et al. .................. 156/515 |
| 3,673,041 | A | * | 6/1972  | Schulz et al. ............... 156/281 |
| 3,752,725 | A | * | 8/1973  | Freeman ..................... 156/367 |

(Continued)

FOREIGN PATENT DOCUMENTS

GB         2001582    *   2/1979

(Continued)

*Primary Examiner*—Philip H. Leung
*Assistant Examiner*—Stephen Ralis
(74) *Attorney, Agent, or Firm*—Wells St. John P.S.

(57) ABSTRACT

An apparatus is provided for forming bag edges in a layered plastic film. The apparatus includes a heated seal bar and a seal bar anvil. The seal bar anvil has a resilient tube configured to deform as the seal bar is driven into the tube to seal and sever a bag edge therebetween. According to one construction, the resilient tube is pressurized pneumatically from the inside so as to impart a specific, desired resilience to the tube as the tube and seal bar co-act on either side of the layered plastic film.

35 Claims, 16 Drawing Sheets

U.S. PATENT DOCUMENTS

| | | | |
|---|---|---|---|
| 3,916,148 A | 10/1975 | LaFleur | 219/243 |
| 4,067,175 A * | 1/1978 | Vinokur | 53/374.8 |
| 4,093,500 A * | 6/1978 | Browne | 156/510 |
| 4,117,306 A * | 9/1978 | Shah | 219/243 |
| 4,193,341 A * | 3/1980 | Clements et al. | 100/326 |
| 4,449,962 A | 5/1984 | Copia | 493/209 |
| 4,464,219 A | 8/1984 | Colombo et al. | 156/251 |
| 4,529,472 A * | 7/1985 | Hsu | 156/498 |
| 4,555,296 A | 11/1985 | Burtch et al. | 156/446 |
| 4,662,978 A | 5/1987 | Oki | 156/498 |
| 4,860,621 A | 8/1989 | Totani | 83/171 |
| 4,872,942 A | 10/1989 | Sharps, Jr. et al. | 156/515 |
| 4,964,207 A | 10/1990 | Daniel | 29/468 |
| 5,034,087 A | 7/1991 | Denker et al. | 156/555 |
| 5,268,058 A | 12/1993 | Cornwell | 156/583.1 |
| 5,277,745 A | 1/1994 | Williams | 156/583.1 |
| 5,403,427 A | 4/1995 | Wilcox | 156/359 |
| 5,474,637 A * | 12/1995 | Soodak | 156/272.6 |
| 5,964,688 A | 10/1999 | Woody et al. | 493/207 |
| 6,416,453 B1 | 7/2002 | Simonetti et al. | 493/269 |
| 6,422,986 B1 | 7/2002 | Claybaker et al. | 493/189 |
| 6,629,917 B2 | 10/2003 | Vanden Langenberg et al. | 493/189 |
| 6,656,310 B2 * | 12/2003 | Basque | 156/251 |
| 2004/0022457 A1 | 2/2004 | Brown et al. | 383/37 |
| 2004/0031552 A1* | 2/2004 | Basque | 156/64 |

FOREIGN PATENT DOCUMENTS

| | | | |
|---|---|---|---|
| WO | | 00/05135 * | 2/2000 |
| WO | WO 2002101815 A1 * | | 12/2002 |

* cited by examiner

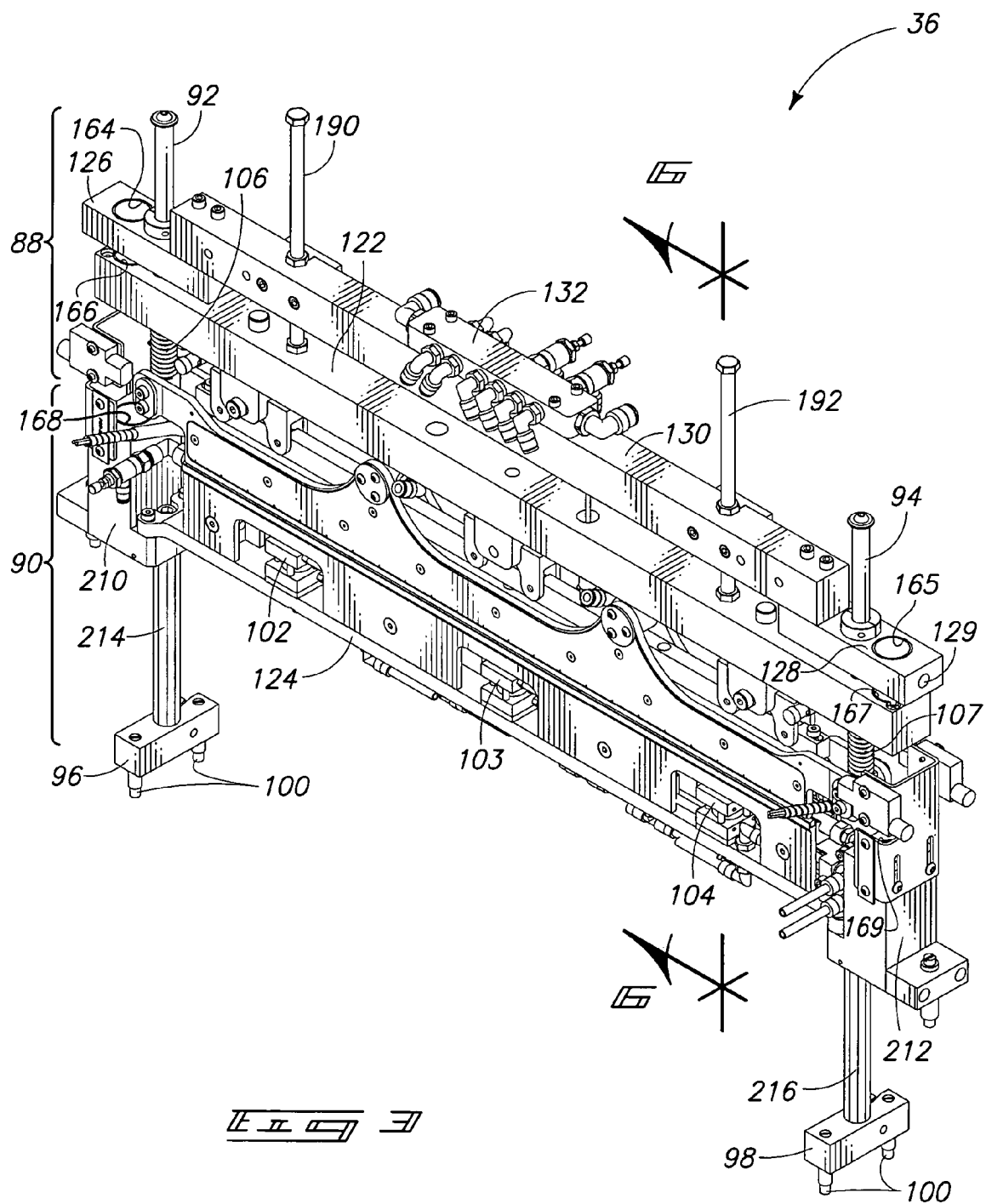

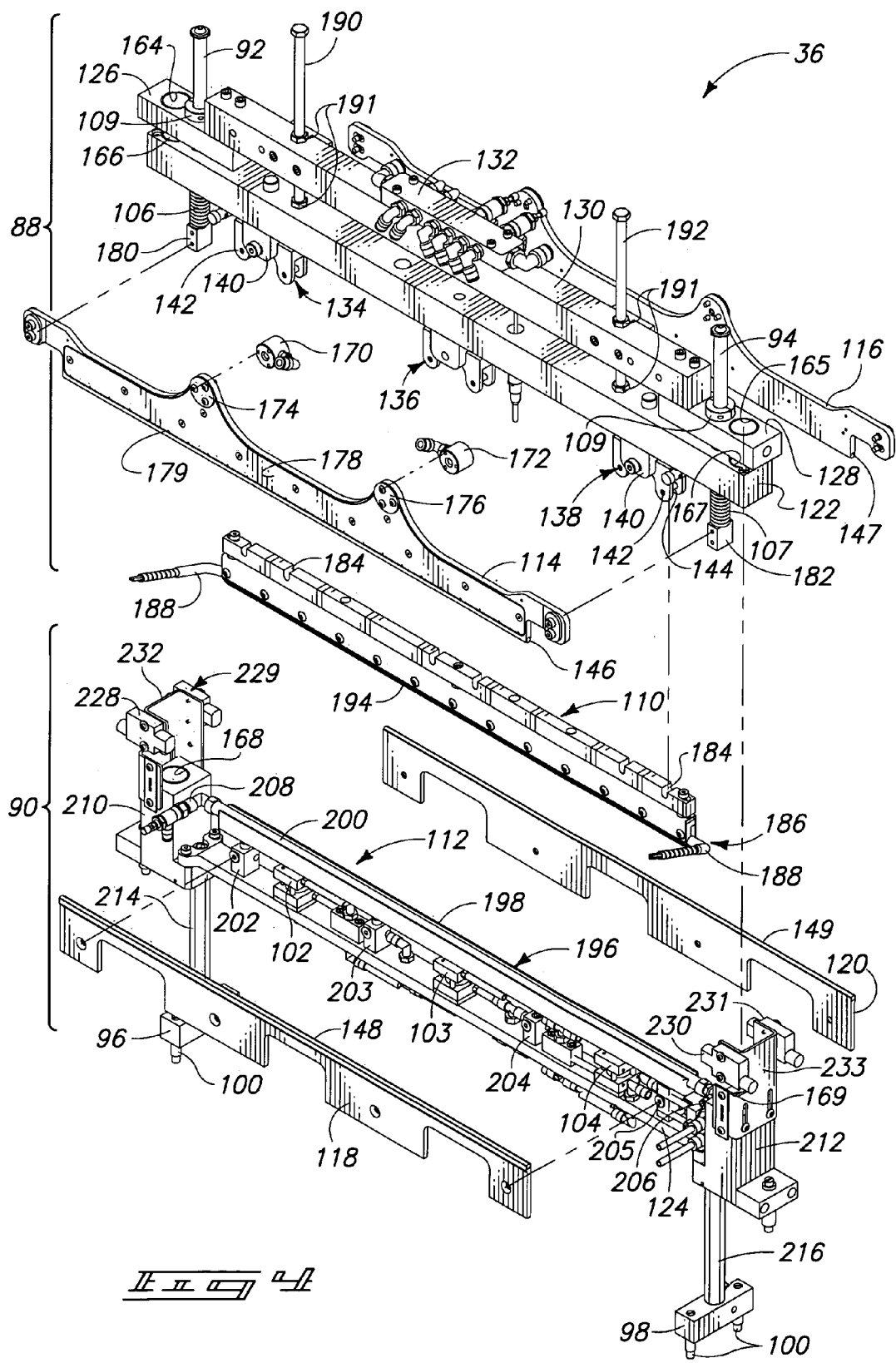

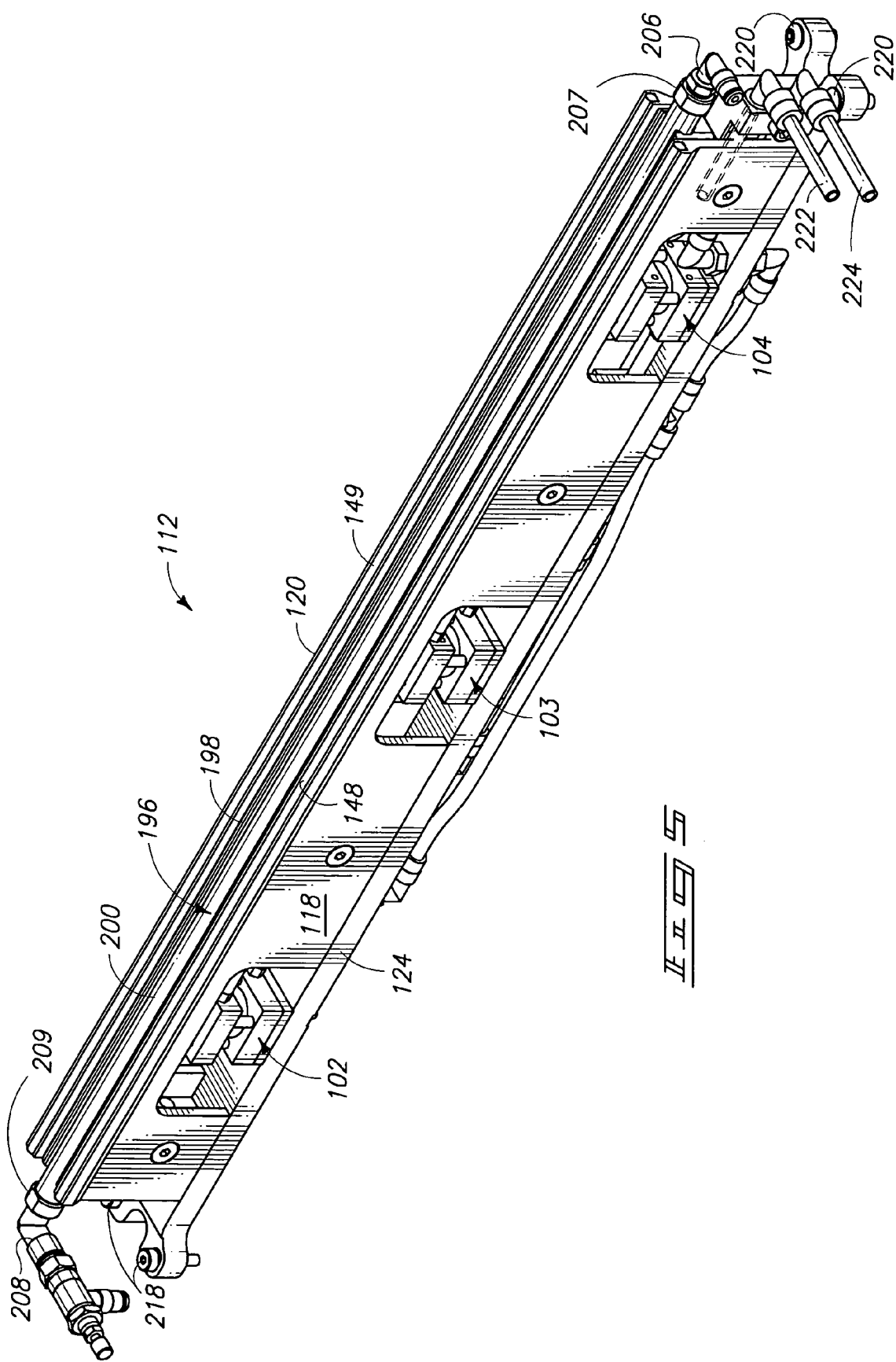

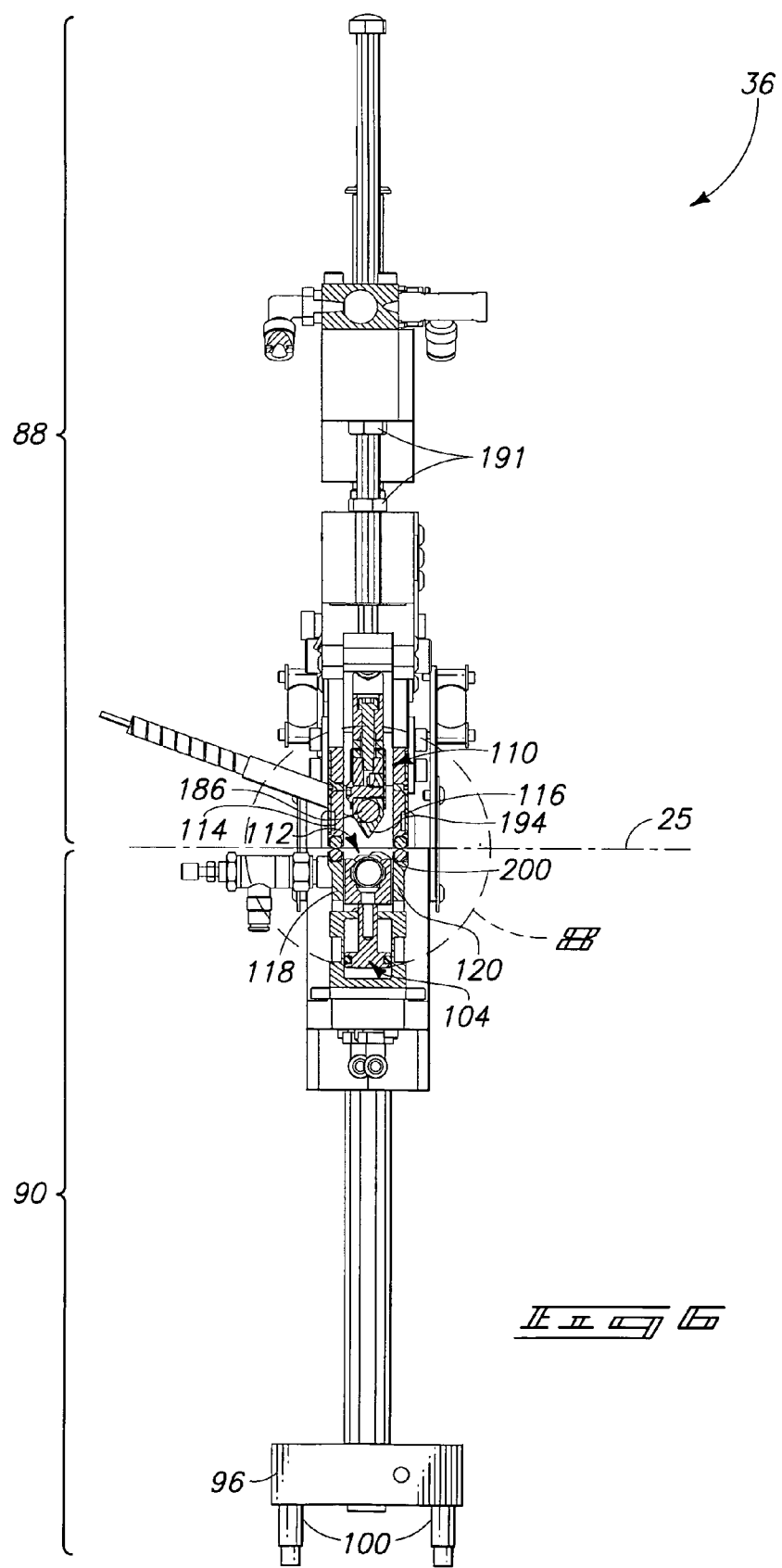

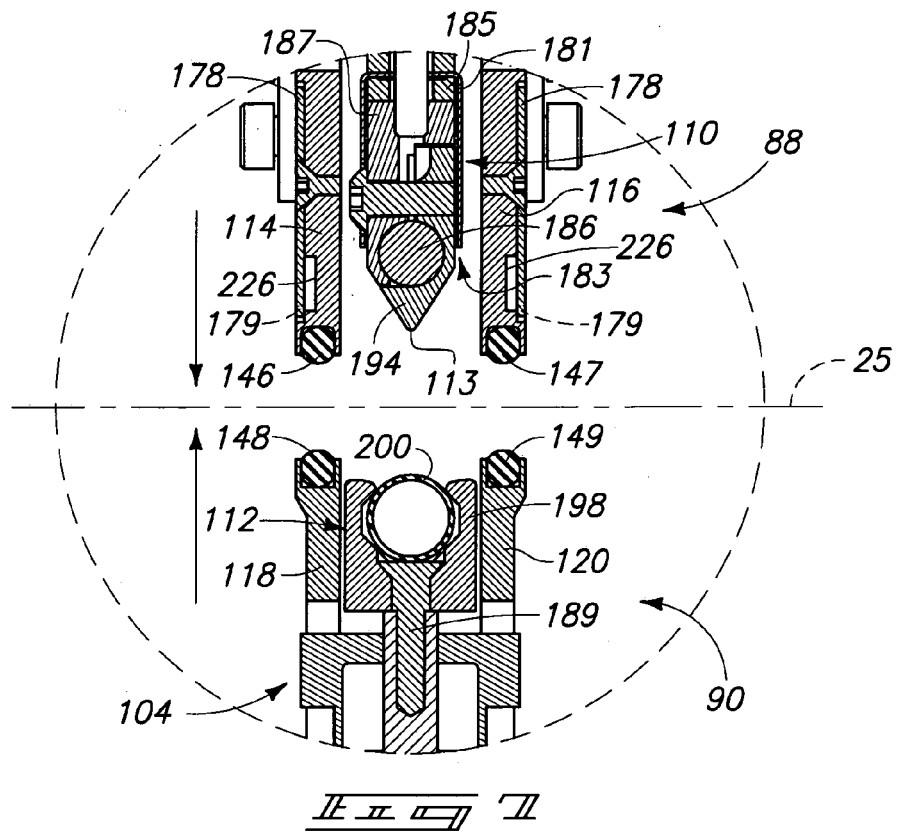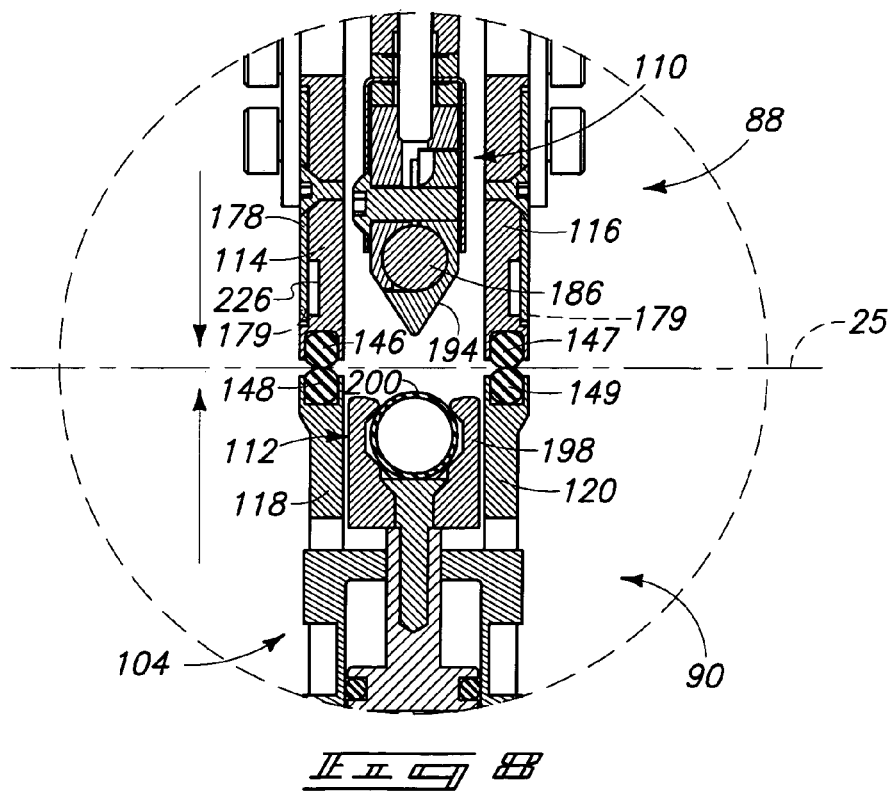

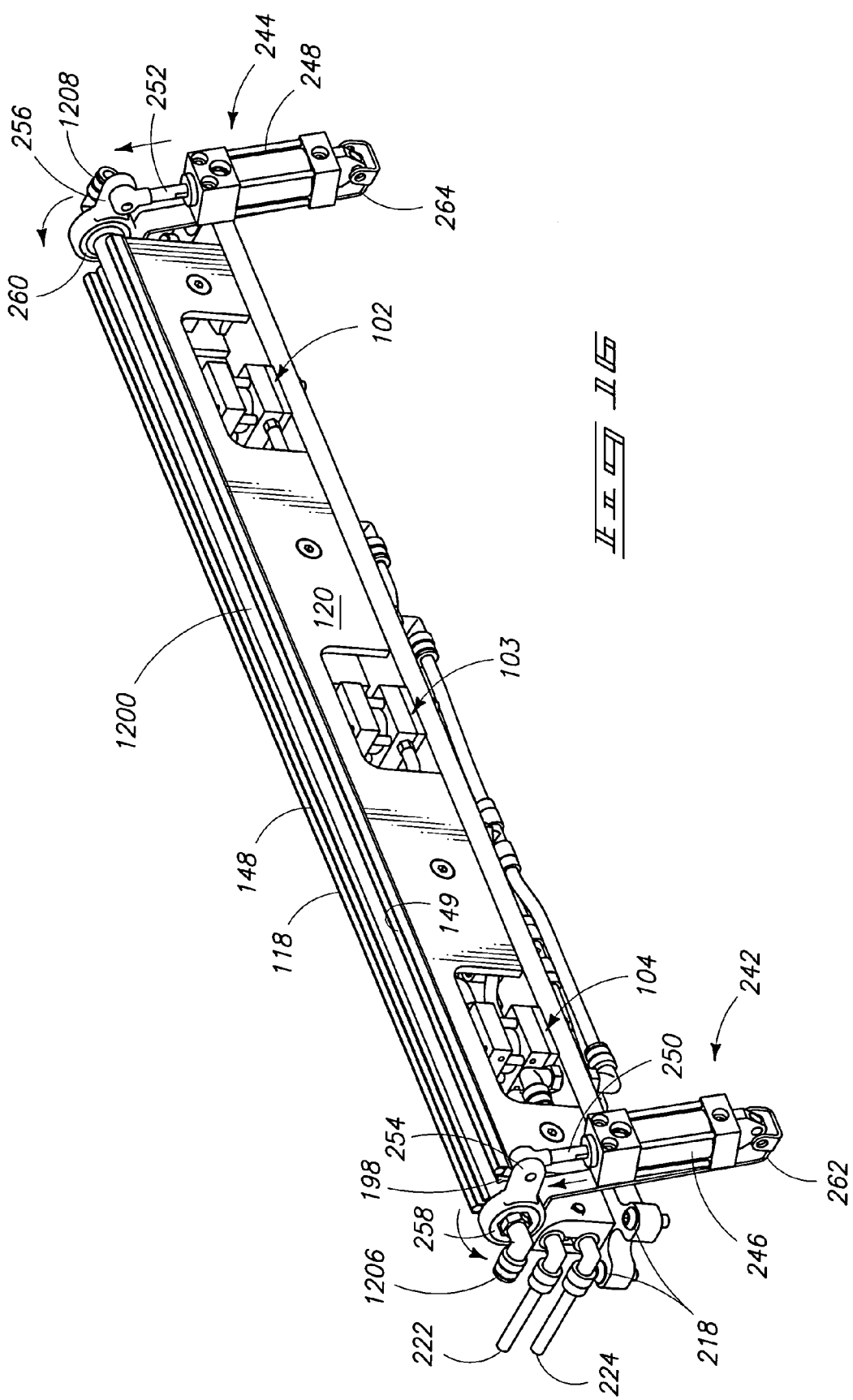

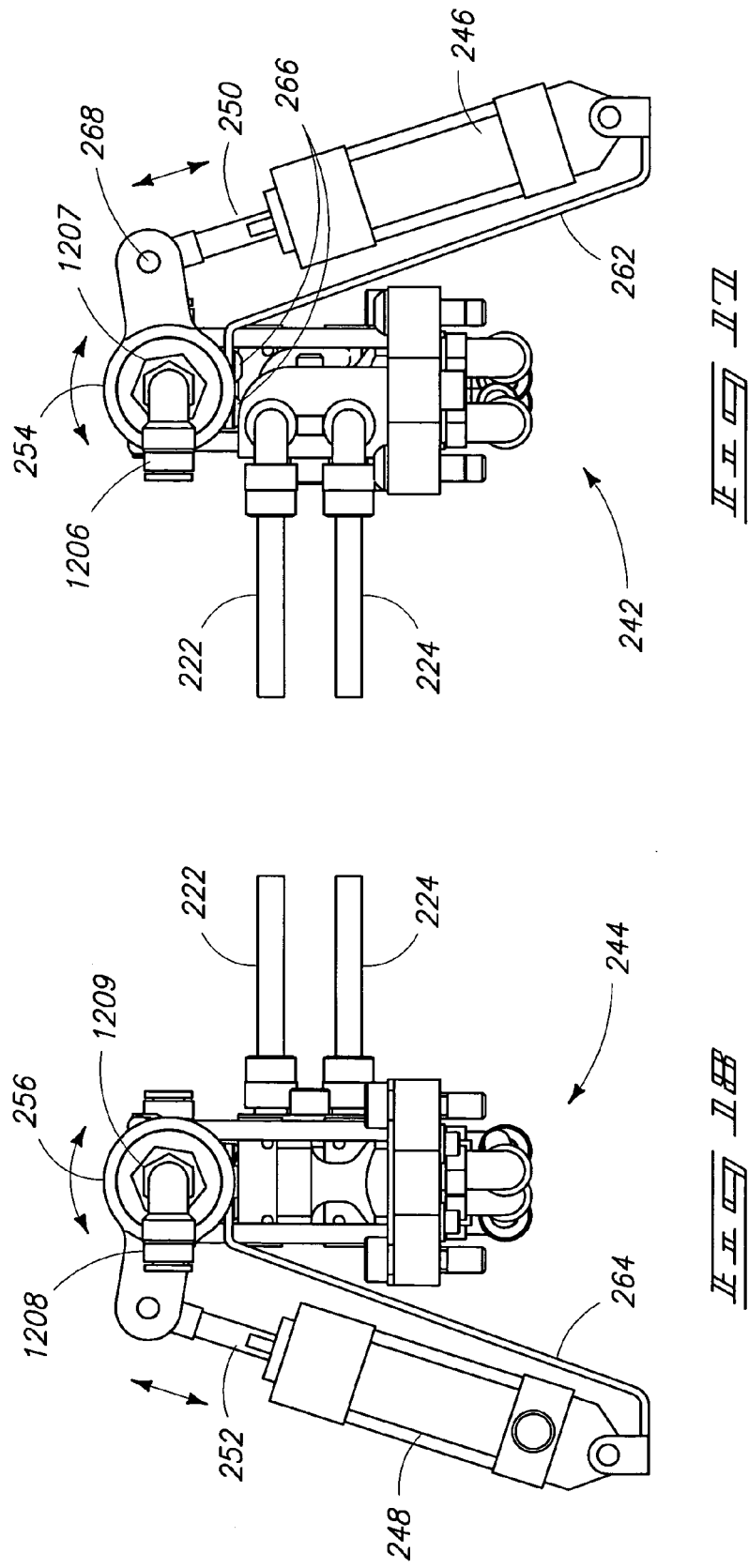

HEAT SEAL APPARATUS, BAG MACHINE, AND BAG EDGE FORMING APPARATUS WITH RESILIENT TUBULAR ANVIL

RELATED PATENT DATA

This application claims priority from U.S. Provisional Patent Application Ser. No. 60/480,339, which was filed Jun. 19, 2003, and U.S. Provisional Patent Application Ser. No. 60/480,144, which was filed Jun. 20, 2003, both of which are incorporated by reference herein.

TECHNICAL FIELD

This invention pertains to an apparatus and method for heat sealing heat-sealable material, such as a thermoformable plastic sheet or film. More particularly, the present invention relates to an improved apparatus for heat sealing and severing a folded film of material to form a bag or pouch from the folded film and inside of which a stack of accumulated articles is encased.

BACKGROUND OF THE INVENTION

A number of machines have been manufactured for heat forming bags or pouches from a continuous roll of thermoformable plastic film material. For example, U.S. Pat. No. 4,229,244 is directed to a manual bag sealer having a lift bar. The heat sealing apparatus includes a fixed upper clamping jaw that has a continuously energized resistance-type heater. The heat sealing apparatus also includes a lower clamping jaw that is pivotally supported for movement about a substantially horizontal axis to upwardly engage the upper jaw and clamp a mouth of a filled, preformed bag between the upper and lower jaws in order to seal the bag. However, the present bag sealing apparatus is a manual device for sealing a filled bag. Accordingly, such construction will not work well with an automated thermoforming line for packaging stacks of accumulated articles in individual bags.

SUMMARY OF THE INVENTION

A heat seal apparatus and bagging machine are provided where a pneumatically filled tube and a heated seal bar are pressed together on either side of a folded thermoformable plastic film to seal the film on either side of the seal bar and to sever the film and form a bag edge on either side of the seal bar. The seal bar is urged into engagement with the pneumatically filled tube so as to ensure even and distributed pressure on the film. While the seal bar is heated, the tube can be temperature controlled by providing a supply of pressurized gas having a certain temperature. For example, room temperature can be used which is substantially lower than the temperature of the seal bar. Alternatively, the air can be heated or cooled with a heat exchanger in order to impart a desired, regulated temperature which assists in fusing the sealed edges as the heated seal bar is brought into engagement with the film so as to heat, pinch, seal and sever the folded film. Alternatively, multiple layers of film can be brought together between the seal bar and the tube in order to seal them together and sever them between the seal bar and the tube. Furthermore, it is desirable to control the gas pressure that is within the tube so as to impart a desired resilience. For example, the tube can be filled with 40 psi air from a shop compressor and tank. Such pressure imparts a desired overall resilience or compliance to the tube which slightly deforms as a seal bar is engaged against the tube during a sealing and severing operation.

According to one aspect, an apparatus is provided for forming bag edges in a layered plastic film. The apparatus includes a heated seal bar and a seal bar anvil. The seal bar anvil has a resilient tube configured to deform as the seal bar is driven into the tube to seal and sever a bag edge therebetween. According to one construction, the resilient tube is pressurized pneumatically from the inside so as to impart a specific, desired resilience to the tube as the tube and seal bar co-act on either side of the layered plastic film.

According to another aspect, a heat seal apparatus is provided with a seal bar and an anvil. The anvil has a resilient, tubular outer wall portion configured to be internally pressurized with pneumatic fluid. One of the seal bar and the anvil is supported for movement toward and away from the other of the seal bar and the anvil.

According to yet another aspect, a bag machine is provided with a conveyor and a bag film sealing assembly. The bag film sealing assembly includes a frame, a seal bar supported by the frame, and an anvil supported by the frame. One of the seal bar and the anvil is supported for movement toward and away from the other of the seal bar and the anvil. The anvil includes a resilient, tubular outer wall portion configured to be internally pressurized with pneumatic fluid.

According to even another aspect, a bag edge forming apparatus is provided with a frame, a seal bar, an internally pressurized, pneumatic anvil, and a kinematic linkage. The seal bar is supported by the frame. The internally pressurized, pneumatic anvil is supported by the frame. The kinematic linkage is configured to move one of the seal bar and the anvil relative to another of the seal bar and the anvil in order to engage and disengage the seal bar and the anvil.

An advantage is provided by improving the speed, uniformity and precision with which layers of plastic film are sealed and severed using a seal bar when forming bag edges in a bagging operation for bagging articles.

BRIEF DESCRIPTION OF THE DRAWINGS

Preferred embodiments of the invention are described below with reference to the following accompanying drawings.

FIG. 3 is a further enlarged perspective view of the seal bar upper and lower assemblies of FIG. 2;

FIG. 4 is an exploded perspective view of the seal bar upper and lower assemblies of FIG. 3;

FIG. 5 is an enlarged, component perspective view for the lower seal bar assembly including an anvil in the form of a compliant tube;

FIG. 6 is a vertical sectional view taken along line 6-6 of FIG. 3 and illustrating in a vertical, side sectional view components of the upper and lower seal bar assemblies;

FIG. 7 is a vertical, sectional view taken within the encircled region 8 of FIG. 6, but showing the upper and lower seal bar assemblies in a separated position, prior to closing;

FIG. 8 is a vertical, sectional view taken within the encircled region 8 of FIG. 6, but corresponding later in time than FIG. 7, and corresponding with the position depicted in FIG. 8 to show engagement of the upper and lower clamp plates between the upper and lower seal bar assemblies;

FIG. 16 is another perspective view of the lower seal bar assembly of FIG. 15 but taken from an opposite side.

FIG. 17 is an end view of the proximate end of the lower seal bar as shown in FIG. 15.

FIG. 18 is an end view of the proximate end of the lower seal bar as shown in FIG. 16, opposite the end depicted in FIG. 17.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising a seal bar assembly for a thermoformed product bagging machine according to one aspect of the present invention. However, alternative embodiments will be understood and described (where appropriate) with reference to the figures.

While the invention is described by way of the preferred embodiment, it is understood that the description is not intended to limit the invention to this embodiment, but is intended to cover alternatives, equivalents, and modifications which may be broader than this embodiment, such as are included within the scope of the appended claims.

Furthermore, in an effort to prevent obscuring the invention at hand, only details germane to implementing the present invention will be described in great detail. Presently understood peripheral details will be incorporated by reference, as needed, as being presently understood in the art.

Figure 1:
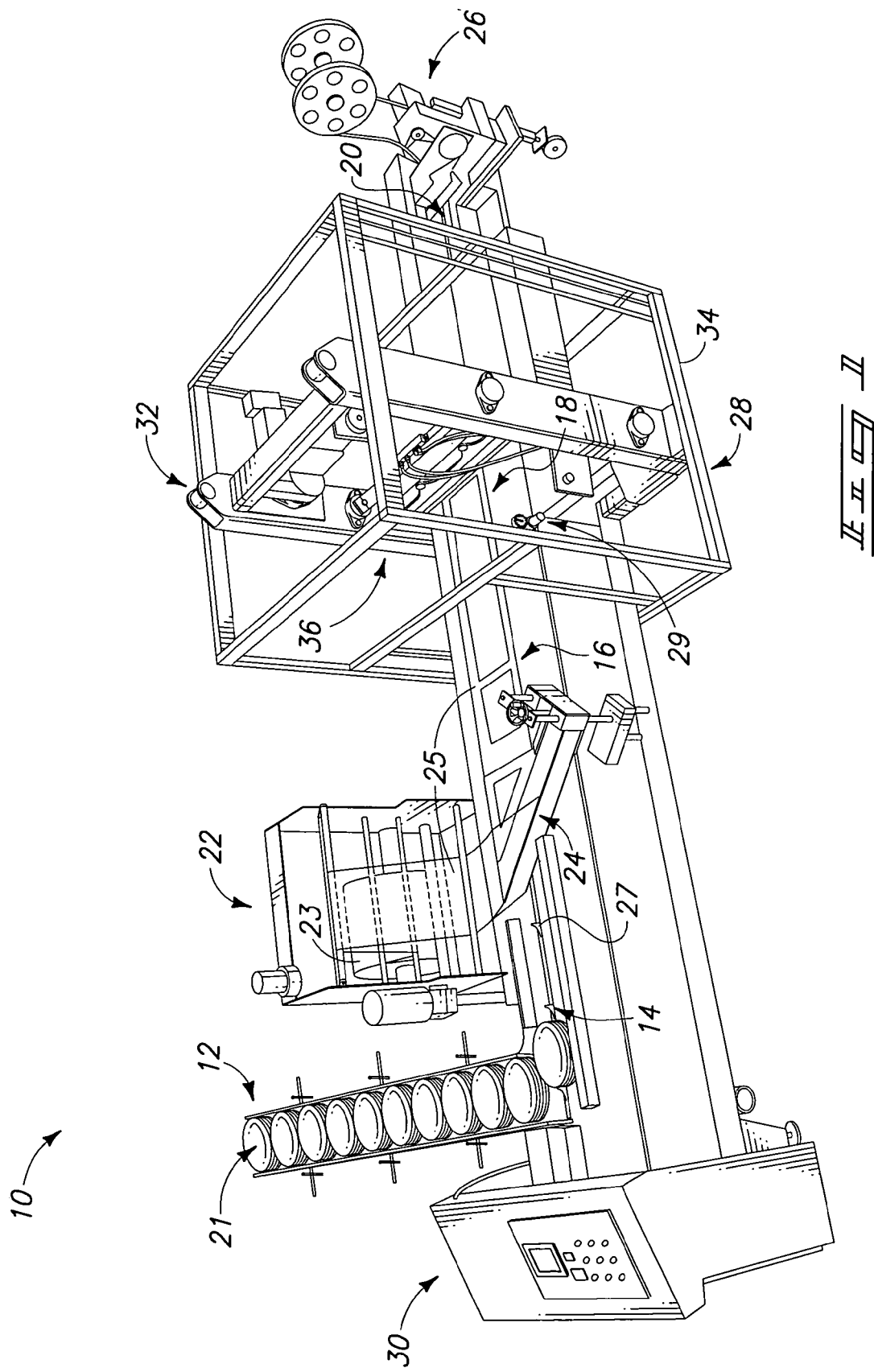
FIG. 1 is a simplified, perspective view representation of a thermoformed product bagging machine for bagging stacks of thermoformed articles.

A preferred embodiment seal bar assembly is first described with reference to FIGS. 1-14 and is identified by reference numeral 36. As shown in FIG. 1, a thermoformed product bagging machine 10 is provided for use downstream of a thermoforming line. A plurality of stacked, thermoformed articles are received via a collection conveyor from a thermoforming machine for conveying the stacked articles onto bagging machine 10 and for loading the stacked articles along a conveyor for enclosure within successive plastic bags which are formed about each stack of articles.

Further details for one suitable construction for a thermoforming machine are disclosed in U.S. Pat. No. 5,773,540, entitled "Mold Assembly for Thermoforming Machine", issued to Jere F. Irwin, et al., on Jun. 30, 1998, and which is incorporated by reference herein.

One suitable construction for a thermoforming line that is provided upstream of bagging machine 10 is disclosed in U.S. patent application Ser. No. 10/460,933, entitled "Web Conveyor and Web Supporting Apparatus", naming as inventors Jere F. Irwin and Dale L. Vantrease, filed on Jun. 12, 2003, and which is incorporated by reference herein.

One suitable construction for a thermoforming machine having an article stacking device and an article accumulator for conveying stacked articles into bagging machine 10 is disclosed in U.S. patent application Ser. No. 09/576,219, entitled "Article Stacking Device, Trim Press Article Accumulator, and Method of Stacking Thermoformed Articles", naming as the inventor Jere F. Irwin, and filed on May 22, 2000, and which is incorporated by reference herein.

As shown in FIG. 1, bagging machine 10 is configured for receiving stacks of thermoformed articles in the form of stacked foamed-plastic plates. A belt conveyor 12 receives individual stacks of accumulated plates from a downstream end of an accumulator and delivery conveyor (not shown) under a thermoforming machine trim press (not shown). Belt conveyor 12 transports stacks of the plates from an accumulator conveyor belt on the article trim press (not shown) onto a perpendicularly extending indexing conveyor 14 which has a plurality of drive fingers that move individual stacks of plates in advancement towards a vacuum conveyor 16. Vacuum conveyor 16 moves the stacks of articles, which are periodically deposited between a folded film 25 toward a seal conveyor 18. Seal conveyor 18 moves stacks 21 of the articles in the folded film 25 downstream through a sealing assembly 28 where bag edges are sealed and severed in the folded film, between stacks 21 of articles. Individual stacks of articles, now in separate bags, are then moved downstream via a closure device conveyor 20 to a Kwik Lok® bag closing machine 26 where a remaining free end of each bag receives a Kwik Lok® closure device to secure the articles within the respective bags. Kwik Lok® is a federally registered trademark of Kwik Lok Corporation, P.O. Box 9548, Yakima, Wash. Folded film 25 is received from a roll 23 of folded film via an unwind assembly 22. Film 25 is stored in a folded manner, inside out, but is later inverted by a film folding station 24 and directed at a 90 degree angle in the form of folded film 25 into which individual stacks 21 of articles are periodically disposed between folded film 25 using drive fingers 27 from indexing conveyor 14.

An electrical assembly 30 provides a power supply and control system for operating bagging machine 10. A sealing assembly frame 32 is provided within a sealing assembly housing 34 where bag side edges are sealed and severed using improvements in design that are presently described below in greater detail.

Except for improvements to the sealing assembly 28 which are described below in greater detail with reference to FIGS. 2-24, remaining portions of bagging machine 10 are presently understood in the art. An earlier version of bagging machine 10 is presently offered for sale by Irwin Research and Development, Inc., of Yakima, Wash., under the name "Stack Packer". However, the improvements presented herein were developed in order to address operating concerns that were determined to be necessary in order to enhance operation of bagging machine 10 at higher operating speeds and to ensure proper sealing and severing of bag edges so as to enhance overall performance of bagging machine 10.

Bagging machine 10 provides a free-standing, continuous motion system configured to bag thermoformed products, such as foamed-plastic plates, in conjunction with a vertical trim press of a thermoforming line, or by way of other machinery that stacks articles. Bagging machine 10 provides a relatively high-speed packing apparatus having controlled motion by way of an operating system provided in electrical assembly 30 in conjunction with servo motors that drive rotary kinematic linkages to position, open, and close seal bars within seal bar assembly 36. Folded film 25 comprises a "C" folded film into which stacks of articles are periodically placed via a conveyor. Seal bar assembly 36 then intermittently closes across the "C" fold film, between adjacent stacks of articles, in order to seal and sever the "C" folded film between adjacent stacks of articles. Accordingly, a bag is created around each stack of articles, and the bag is advanced to a closing station by way of conveyor 20 where fasteners are secured to the remaining free end of the bag by way of closing machine 26.

As shown in FIG. 1, a Kwik Lok® bag closing machine is used to provide closure to the respective bags by applying plastic clips. Alternatively, a wire-tie closing machine can be provided for closing the bags. Bagging machine 10 and all of its accompanying conveying and sealing systems are controlled by a motion/PLC control that is provided within electrical enclosure assembly 30. Electrical assembly 30 is mounted to a common frame for bagging machine 10.

Figure 2:
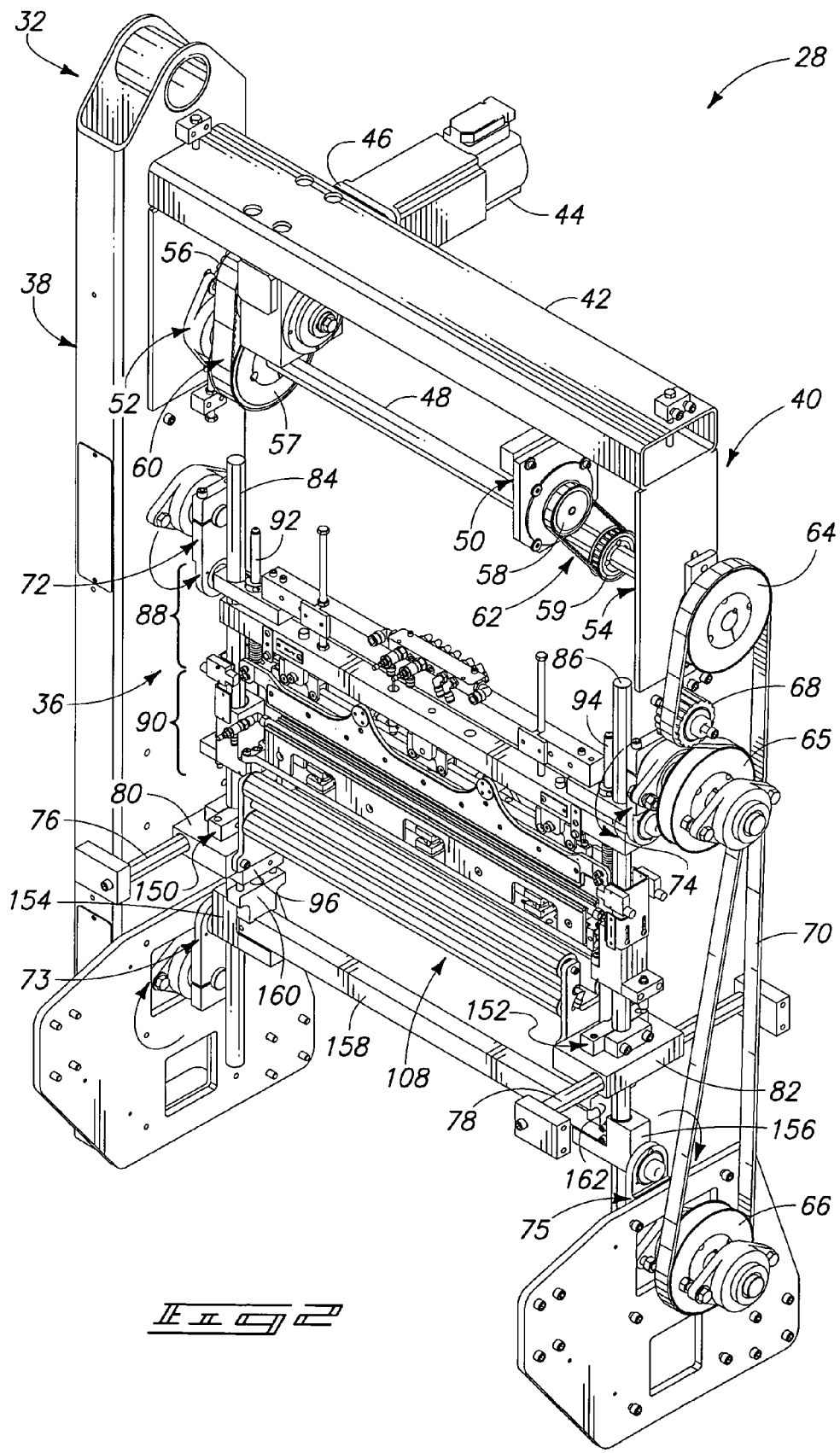
FIG. 2 is an enlarged, partial perspective view of the sealing assembly of FIG. 1, but eliminating the sealing assembly housing and a portion of one frame upright in order to facilitate viewing of a drive mechanism for driving motion of the sealing assembly.

As stored on roll 23, folded film 25 is inverted such that print (text and/or graphics) is provided on the inner faces, after which film folding station 24 inverts the folded film inside out such that the print is then provided on the outside. FIG. 2 illustrates critical operating components for sealing assembly 28, but omits the sealing assembly housing 34 (as shown in FIG. 1). It is understood that the sealing assembly housing comprises a metal frame having plexiglass panels that serve as a shield for personnel who are working around the operating bagging machine. Remaining portions of sealing assembly 28 depicted in FIG. 2 include frame 32 comprising parallel upright frame members 38 and 40. In order to facilitate viewing of operating components contained therein, upright frame member 40 is shown with the main tubular, rectangular upright member omitted in order to facilitate viewing of the internal operating components contained therein. It is understood that upright frame member 38 also contains substantially identical operating components which are provided in mirror image to the operating components contained in upright frame member 40. Accordingly, seal bar assembly 36 can be driven in reciprocating motion between its upper seal bar assembly 88 and its lower seal bar assembly 90 by way of pairs of crank arms 72-74 and 73-75. Crank arms 72-75 are driven by respective taper lock pulleys, such as pulleys 65 and 66, by way of a respective timing belt, such as timing belt 70. Timing belt 70 comprises a twin-toothed timing belt that is driven by a taper lock pulley 64. Pulley 64 is driven by a jack shaft 48 that is supported at either end by a respective bearing 52 and 54. Jack shaft 48 is driven by a corresponding taper lock pulley 57 that is driven via another timing belt 60 by way of a taper lock pulley 56 that is directly coupled with a reducing worm gear 46, which is driven by a servo motor 44. Servo motor 44 and worm gear 46 are carried by a horizontal cross-member 42 of frame 32.

Additionally, a rotary encoder 50 measures rotational positioning of jack shaft 48 in order to measure rotary positioning of upper seal bar assembly 88 and lower seal bar assembly 90 by way of taper lock pulley 58 and 59 which communicate via another timing belt 62 to tie encoder 50 directly with rotational positioning of jack shaft 48.

Accordingly, servo motor 44 drives jack shaft 48 which drives a belt drive system provided in each upright frame member 38-40 to rotate crank arms 72-75. For example, upright frame member 40 includes timing belt 70 which is driven via pulley 64 by jack shaft 48 and servo motor 44. Additionally, an idler pulley 68 is provided along belt 70 to maintain tension on belt 70. Pulley 65 is secured onto a shaft that drives crank arm 74, whereas pulley 66 is rigidly affixed onto a shaft that drives crank arm 75. Crank arms 72 and 74 are driven in a counter-clockwise direction while crank arms 73 and 75 are driven in an opposing, clockwise direction, as shown in FIG. 2. Furthermore, crank arms 72, 74 and 73, 75 are counter-driven to positions that are 180 degrees apart such that maximum separation of seal bar assembly 36 occurs when crank arms 72 and 74 are at a 12:00 o'clock position and crank arms 73 and 75 are at a 6:00 o'clock position. Similarly, seal bar assembly 36 is in a maximally closed configuration when crank arms 72 and 74 are in a 6:00 o'clock position and crank arms 73 and 75 are in a 12:00 o'clock position when viewing sealing assembly 28 in side view.

In order to ensure vertical reciprocation of an upper seal bar assembly 88 and a lower seal bar assembly 90 of seal bar assembly 36, a pair of die posts 84 and 86 are supported in a vertically fixed configuration via a pair of seal bar horizontal guide blocks 80 and 82. Clamp assemblies 150 and 152 are secured to each guide block 80 and 82, respectively, to vertically rigidly affix respective die posts 84 and 86 securely onto guide blocks 80 and 82. Guide blocks 80 and 82 each include a through bore with a horizontal bushing configured to slidably receive a respective one of the horizontal die posts 76 and 78 that is mounted to each upright frame member 38 and 40, respectively.

Accordingly, horizontal die posts 76 and 78 enable horizontal, fore and aft translation of guide blocks 80, 82 and vertical die posts 84 and 86, respectively, as crank arms 73 and 75 drive die posts 84 and 86 to and fro along a horizontal axis coincident with horizontal die posts 76 and 78.

More particularly, crank arms 73 and 75 each rotatably affix to a bushing block 154 and 156, respectively, with each bushing block including a vertical bore that holds a bushing into which vertical die posts 84 and 86 are respectively received. As bushing blocks 154 and 156 are rotated circumferentially by crank arms 73 and 75, bushing blocks 154 and 156 slide up and down die posts 84 and 86, driving die posts 84 and 86 into horizontal, translating motion via cooperation of guide blocks 80 and 82 translating along horizontal die posts 76 and 78. Hence, guide posts 84 and 86 move forward and backward. However, guide posts 84 and 86 are restrained from moving vertically in any manner. Furthermore, guide posts 84 and 86 are driven to and fro, while maintaining a vertical orientation. Accordingly, upper seal bar assembly 88 and lower seal bar assembly 90 are further driven in oscillation up and down along guide posts 84 and 86 as they open and close relative to one another about a folded film of thermoformable plastic material.

In order to drive lower seal bar assembly 90 up and down, lower seal bar assembly 90 includes a pair of shock mounting blocks 96 and 98 (see FIG. 3 for shock mounting block 98). Each shock block mounts atop a base block 160 and 162 that is carried by a crossbar 158. Crossbar 158 is supported at either end by bushing block 154 and 156. Accordingly, crank arms 73 and 75 rotate crossbar 158 via bushing blocks 154 and 156 completely circumferentially thereabout, which drives lower seal bar assembly 90 upward and downward along vertical die posts 84 and 86.

As shown in greater detail with reference to FIG. 3, the lower crank arms 73 and 75 (of FIG. 2) drive lower seal bar assembly 90 up and down (as well as fore and aft) by supporting and moving lower seal bar assembly 90 via shock blocks 96 and 98. Shock mounting blocks 96 and 98 are rigidly secured at a bottom end of posts 214 and 216, respectively. Posts 214 and 216 depend from bushing blocks 210 and 212. Bushing blocks 210 and 212 rigidly support a horizontal lower frame member 124 of lower seal bar assembly 90. Lower frame member 124 carries a plurality of air cylinders 102-104 which are further used to actuate a seal bar anvil 196 of a seal bar assembly 112 vertically up and down while heat-sealing and severing a bag (see FIG. 5).

Also shown in FIG. 3, each shock mounting block 96 supports a pair of oil shocks 100 that mount lower seal bar assembly 90 in shock-mounted isolation atop base blocks 160 and 162. Accordingly, any contact shock that is imparted as upper seal bar assembly 88 and lower seal bar assembly 90 engage is isolated or reduced from transmission through the remaining portions of sealing assembly 28.

FIG. 2 also includes a fore and aft pair of roller assemblies 108 which are each provided on opposite sides of lower seal bar assembly 90. Roller assemblies 108 cooperate to feed a belt of seal conveyor 18 (see FIG. 1) beneath lower seal bar assembly 90, as lower seal bar assembly 90 is moved up and down and as the belt passes from upstream of the seal bar assembly 90 to a position downstream of the seal bar assembly 90.

As shown in FIG. 3, upper seal bar assembly 88 includes an upper frame 122 that is adjustably positioned relative to a manifold cross-member 130 and a pair of drive blocks 126 and 128 by way of a pair of adjustable, threaded rods 190 and 192. Threads and nuts on rods 190 and 192 can be used to adjust the relative horizontal and alignment positioning between upper frame 122 and manifold cross-member 130. A threaded bore on an outer end of each drive block 126 and 128, such as threaded bore 129 on block 128, receives a threaded fastener that is driven by one of crank arms 72 and 74 (see FIG. 2). Accordingly, drive blocks 126 and 128 serve as fixation points for the crank arms that drive upper seal bar assembly 88 vertically up and down (and fore and aft). Furthermore, bores 164 and 165 are provided in bushing blocks 126 and 128, respectively, in which solid bushings are placed therein. For example, fiber or bronze bushings can be used. Furthermore, bores 166 and 167 are provided at opposite ends of upper frame 122 in which similar bushings are provided. It is understood that drive blocks 126 and 128 and upper frame 122 slide up and down along vertical die posts 84 and 86 (see FIG. 2) as they are received within bores 164-167.

Upper seal bar assembly 88 also includes a pair of vertical die posts 92 and. 94, at opposite ends. Springs 106 and 107 are provided along each die post 92 and 94, respectively. Functioning of these springs will be described below with reference to FIG. 4. Additionally, a pneumatic manifold 132 is supported atop cross-member 130 for receiving a supply of compressed air (not shown) which is used to drive movement of certain machine components and to provide for cooling air relating to other components in the machine, as described below in greater detail. Accordingly, FIG. 3 depicts components of seal bar assembly 36 used in heat-sealing and severing a folded web of thermoformable plastic material.

FIG. 4 illustrates in an exploded perspective view the construction of upper seal bar assembly 88 and lower seal bar assembly 90 that cooperate to form seal bar assembly 36. More particularly, upper seal bar assembly 88 includes a pair of upper clamp plates 114 and 116 that are supported on either side of seal bar assembly 110.

As shown in FIG. 4, clamp plates 114 and 118 are secured at either end to mounting blocks 180 and 182, respectively, using threaded fasteners. Springs 106 and 107 downwardly depress mounting blocks 180 and 182 and respective clamping plates 114 and 116 to a maximum downward position relative to seal bar assembly 110. However, clamping collars 109 on die posts 92 and 94 limit the maximum downward position. As clamp plates 114 and 116 engage with a complementary, corresponding set of lower clamp plates 118 and 120, springs 106 and 108 each compress, enabling further downward displacement of seal bar assembly 110 relative to a seal bar substrate assembly 112 as plates 114 and 116 stop moving.

Seal bar assembly 110 includes a seal bar 194 that is heated with a pair of opposed and axially aligned heater rods 186 that deliver heat via electrical resistance. Seal bar 194 is heated to a temperature sufficient to seal and sever a folded web of thermoformable plastic material as it is compressed between a leading nip edge of seal bar 194 and a pneumatically inflated tube 200 of seal bar substrate assembly 112.

Additionally, as shown in FIG. 4, seal bar assembly 110 includes a plurality of slots 184 provided along a top edge of assembly 110 to facilitate quick and easy insertion and removal of seal bar assembly 110 relative to upper seal bar assembly 88. More particularly, a plurality of mount block clamp assemblies 134, 136 and 138 are mounted to a bottom surface of upper frame 122. Each mount block clamp assembly 134, 136 and 138 includes a mount block 140 rigidly affixed to the bottom side of upper frame 122 and a seal bar clamp 142 that includes a pair of spaced-apart threaded fasteners 144. Fasteners 144 are tightened and loosened, while received in a respective one of slots 184 to clamp and release a top width thickness of seal bar assembly 110 with clamps 142 in order to mount and de-mount seal bar assembly 110 from clamp assemblies 134, 136 and 138.

As shown in FIG. 4, rods 190 and 192 include threaded surfaces and three adjustably positioned mounting nuts 191 that enable adjustment of the distance between manifold cross-member 130 and upper frame 122. A pair of nuts 191 engage the top and bottom surfaces of member 130 to fix member 130 along each rod 190 and 192. (Also see FIG. 6.) A third nut 191 affixes a bottom end of each respective rod 190 and 192 to a top surface of frame 122. Accordingly, member 130 can be raised or lowered relative to member 122 by adjusting positioning of the top two nuts. Additionally, one end of member 130 can be raised or lowered more than another end of member 130 relative to member 122 in order to provide a parallel alignment between a leading edge of seal bar 194 as seal bar 194 co-acts with tube 200 of seal bar substrate assembly 112.

Upper clamp plates 114 and 116 each include an air manifold comprising an array of channels, or grooves, 226 (see FIG. 7) which are encased by a thin, stainless steel cover plate, such as cover plate 178 on clamp plate 114. The channels extend through each clamp plate 114 and 116 from a manifold 170 and 172 that is secured in sealing engagement with an inner surface of each upper clamp plate 114 and 116. A bore is provided through each plate 114 and 116 to deliver a supply of compressed air through each plate 114 or 116 to an outer surface that is beneath fastening plate 174 and 176, respectively, and communicating with the manifold.

Plates 174 and 176 mount atop cover plate 178, and the through-bore communicates with an array of channels on the outer surface of each plate 114 and 116 that radiate out to orifices 179 that feed a flow of cooling air beneath cover plate 178 to emit air, under pressure, from a plurality of the orifices, or apertures, 179 provided along a bottom edge of cover plate 178. The channels forming the manifold can be laser cut into clamp plates 114 and 116 when clamp plates 114 and 116 are fabricated from aluminum plates (see channel 226 in FIG. 7).

Orifices 179 comprise slits that are cut into a bottom edge of cover plate 178. Orifices 179 are spaced along a bottom edge length of cover plate 178, adjacent a bottom edge of each clamp plate 114 and 116 so as to direct cooling air from orifices 179 adjacent and along a longitudinal seal 146 and 147 (made of rubber, O-ring-type material) that is provided on a bottom edge surface of each clamp plate 114 and 116, respectively. Hence, a supply of cooling air is received from a manifold 132 atop manifold cross-member 130 (via a flexible pneumatic hose) into each manifold 170 and 172 for delivery to orifices 179 to cool the rubber seals 146 and 147 of O-ring-type material. Hence, such seals are cooled and protected from being overheated because of their proximity to the heated seal bar 94 of seal bar assembly 110.

In one case, stainless steel cover plates 178 receive a bead of RTV silicone on their inner surface, prior to engaging against an outer surface of each cover plate 146 and 147 so as to prevent leaking of air between cover plate 178 and the respective clamp plates 146 and 147. Accordingly, pressurized air is only emitted from the resulting manifold via orifices 179.

According to one construction, manifold 132 receives a supply of pressurized air from an outlet end of resilient tube 200 of seal bar substrate assembly 112. According to such construction, a supply of pressurized air is received from a supply line of a compressor system at an inlet 206 to tube 200. The compressed air originates from a storage tank of a compressor. The air is dropped in pressure using a pressure regulator to a desired pressure, which cools the air. A pressure regulator 29 (of FIG. 1) is used to locally set pressure for the air to maintain a certain, desired pressure and rigidity within tube 200, after which the air exits via outlet 208 where it is supplied to manifold 132 for delivery and cooling of seals 146 and 147 via orifices 179. Flow of pressurized air is received from outlet 208 to manifold 132 via a flexible pneumatic line (not shown).

As shown in FIG. 4, seal bar assembly 110 includes aluminum seal bar 194 which is provided along a bottom edge of assembly 110. Seal bar 194 is also in physical engagement with a pair of cylindrical heater rods that extend axially within seal bar assembly 110. The heater rods comprise resistance-element heater rods and are identified by reference numeral 186 in FIG. 6. Each heater rod receives power supply from an electrical supply line 188 that exits from opposite ends of seal bar assembly 110. Accordingly, the heater rods are placed end-to-end, in axial alignment within seal bar assembly 110, to impart heat to seal bar 194 to seal and sever plastic thermoformable sheet material that is compressed against the bottom edge of seal bar 194 as seal bar 194 is driven into compressible engagement with pneumatically inflated tube 200 on seal bar substrate assembly 112. Temperature of rods 186 can be set to a desired level. In one case, rods 186 are heated to approximately 700 degrees Fahrenheit. Other temperatures can be used, depending on the materials being sealed and severed.

Lower seal bar assembly 90 of FIG. 4 also includes a longitudinal seal 148 and 149 made from a resilient rubber, O-ring-type material that is provided along the top edge of each lower clamp plate 118 and 120, respectively. It is understood that seals 148-149 are each compressibly fit within a groove provided along the respective edge of each clamp plate 114, 116, 118 and 120. Each clamp plate is secured to mounting blocks 202-205 that are rigidly affixed atop and in spaced-apart relation to frame member 124. A plurality of recessed-head threaded fasteners (not shown) are used to secure each lower clamp plate 118 and 120 to mounting blocks 202-205.

Frame member 124 is secured at either end with a plurality of threaded fasteners to bushing blocks 210 and 212, respectively. Bushing blocks 210 and 212 are each supported via a vertical post 214 and 216, respectively, atop shock blocks 96 and 98. Shock blocks 96 and 98 include oil shocks 100, as previously discussed, which support lower seal bar assembly 90 atop base blocks 160 and 162 (of FIG. 2) as the assembly is driven via the lower crank arms 73 and 75 (of FIG. 2).

Resilient tube 200 of seal bar substrate assembly 112 is encased longitudinally within the longitudinal groove in a tube mount bar 198 to provide a resilient seal bar anvil. When encased within the groove of tube mount bar 198, tube 200 is inflated by pressurized gas to provide a resilient seal bar anvil 196 against which a bottom edge of seal bar 194 is urged to heat and seal thermoformable plastic sheet material when forming edges of a bag. Gas pressure can be adjusted to tailor the stiffness (or resilience) of tube 200.

In order to further enhance the urging of seal bar 194 against tube 200, tube mount bar 198 is supported atop lower frame member 124 via a plurality of pneumatic cylinders 102-104. Blocks 210 and 212 at either end of seal bar assembly 90 each support a bracket 232 and 233, respectively, on which pairs of sensors 228, 229 and 230, 231 are supported. One of sensors 228, 229 comprises an optical emitter, whereas another of sensors 230, 231 comprises an optical detector such that an optical beam is provided between pairs of emitters and detectors for sensing the presence of stacked articles between such sensors. Accordingly, the presence of a stack of articles can be detected. This information can be used to time when seal bar assembly 110 is driven into engagement with seal bar substrate assembly 112 to form a bag edge in multiple layers of thermoformable plastic sheet material provided therebetween. Accordingly, sensors 228-231 can be used as a safety switch along with a control system in order prevent operation or to re-time operation when upper seal bar assembly 88 is brought into engagement with lower seal bar assembly 90 based on the detected position of articles relative to a folded film.

Furthermore, bores 164, 166 and 168 are axially aligned to slidably receive die post 84 (see FIG. 2), and bores 165, 167, and 169 are axially aligned to slidably receive die post 86 (see FIG. 2).

As shown in FIG. 5, seal bar substrate assembly 112 is depicted in enlarged perspective view so as to illustrate the positioning of tube 200 which is press-fit into a rectangular groove within tube mount bar 198. As previously discussed, tube mount bar 198 can be raised and lowered relative to lower clamp plates 118 and 120 by way of three pneumatic cylinders 102-104.

As previously discussed, lower clamp plates 118 and 120 each include a linear rubber seal 148 and 149, respectively, made of rubber O-ring-type material which is compressed into a top edge groove in each clamp plate 118 and 120. Additionally, seal bar substrate assembly 112 is affixed at opposite ends to blocks 210 and 212 (see FIG. 4) via threaded fasteners 218 and 220, respectively.

As shown in FIG. 5, tube 200 has a sealed end fitting 207 and 209 at each respective end. Fittings 207 and 209 have a generally circumferential outer surface with a pair of opposed flat surfaces provided therein.

Resilient tube 200, according to one construction, is formed from a friction-reducing material such as a tube of polytetrafluoroethylene. One such tube is provided by Chemfluor® polytetrafluoroethylene (PTFE) tubing having a one-half inch inner diameter and a 7/16 inch outer diameter. Chemfluor® is a registered trademark of Chemplast, Inc. of Wayne, N.J. One form of polytetrafluoroethylene (PTFE) is Teflon®, a trademark of E.I. DuPont de Nemours and Company, of Wilmington, Del. Tube 200 has an inlet fitting 206 coupled with fitting 207 at an inlet end and an outlet fitting 208 coupled with fitting 209 at an outlet end. A supply of pneumatic air, such as from a shop's compressed air line, is fed to inlet 206 to deliver air at a desired pressure into tube 200 where the pressured air leaves via outlet 208. Circulation of air through tube 200 cools tube 200 and provides a heat sink for the resilient seal bar anvil. Alternatively, tube 200 can be made of any flexible material, such as braided or extruder tubes. Even furthermore, tube 200 can be made with any of a number of alternative friction-reducing materials.

In one case, the supply of pressurized air is regulated using regulator 29 (of FIG. 1) which regulates pressure from a pneumatic shop line for delivery to inlet 206 (or to a control manifold (not shown)). A user can merely adjust the pressure setting at regulator 29 to realize a desired value.

In order to raise and lower tube 200 and mount bar 198 during a sealing and severing operation to form bag edges, an extension line 222 delivers a supply of pressurized air to extend pneumatic cylinders 102-104 and a retraction line 224 delivers pressurized air to cylinders 102-104 to retract or lower pneumatic cylinders 102-104. In one case, a flexible pneumatic line delivers the pressurized air from outlet fitting 208 back up to upper manifold 132 (of FIG. 4).

FIG. 6 illustrates in vertical sectional view and side view seal bar assembly 36 positioned to clamp multiple layers of plastic film prior to engaging the seal bar with the anvil in order to seal and sever a bag edge therebetween. Accordingly, upper clamp plates 114 and 116 are engaged with lower clamp plates 118 and 120 so as to entrap folded film 25 therebetween.

Although seal bar assembly 36 has been described as being used to form bag edges transversely in a folded plastic film, it is understood that multiple layers of individual films or webs can be similarly sealed and severed using the previously-described seal bar assembly. Likewise, a tube of thermoformable film can also be sealed and severed intermittently using the seal bar assembly. Furthermore, more than two layers of film can also be sealed and severed using such seal bar assembly.

FIGS. 7-14, all taken from within the encircled region 8 of FIG. 6, depict various sequential stages used in sealing and severing plastic film 25. Seal bar 194 is illustrated in a slightly raised position over film 25, prior to lowering seal bar 194 into contact with film 25. Subsequently, pneumatic cylinders (such as pneumatic cylinder 104) upwardly drive tube 200 of seal bar substrate assembly (or anvil) 112 into engagement with the bottom edge of seal bar 194.

FIG. 7 illustrates the position of interface components that engage between upper seal bar assembly 88 and lower seal bar assembly 90 as the two assemblies are being brought together to close together onto a folded thermoformable plastic film 25.

By action of the drive arms and kinematic linkages which were previously depicted with reference to FIG. 2, upper clamp plates 114 and 115 move downwardly with upper seal bar assembly 88 and lower clamp plates 118 and 120 move upwardly with lower seal bar assembly 90. Such motion continues until seals 146 and 147 are driven into resilient engagement with seals 148 and 149, gripping and entrapping folded film 25 therebetween so as to securely hold and retain such folded film 25 for further processing between a nip 113 on heated seal bar 194 and pneumatically inflated tube 200, as illustrated below with reference to FIGS. 10-12.

As shown in FIG. 7, tube mount bar 198 is shown in a lowered, or retracted, position as cylinder 104 is provided positioned in a lowered, or retracted, position.

Additionally, the construction of cooling air channels that form an array, or manifold, within upper clamp plates 116 and 118 are further depicted. Channels 226 are preferably laser etched into outer surfaces of clamp plates 116 and 118, as such plates are preferably formed from aluminum. Stainless steel cover plate 178 is then affixed to the outer surfaces of plates 114 and 116 so as to cover channels 226. Cover plates 178 include a plurality of orifices 179 that emit air under pressure therefrom so as to locally cool the bottom edge of clamp plates 114 and 116, in the vicinity of seals 146 and 147.

A pneumatic cooling system is provided via orifices 179 because heater rods 186 heat seal bar 194 such that nip 113 is heated sufficiently to seal and sever folded film 25 when engaged there against. However, heater rods 186 also create a source of heat that would otherwise heat side plates 114 and 116 sufficiently to potentially deteriorate seals 146 and 147. Accordingly, cooling air being delivered via orifices 179 has been found to be desirable and to benefit performance of such seals 146 and 147 during a continuously operating bagging process.

Additionally, a U-shaped heat shield 181 encompasses the sides and tops of seal bar assembly 110 which serves as a heat shield and insulator. Preferably, heat shield 181 is formed from a black ceramic-coated piece of sheet metal. Intermittent spacers 185 are provided between a top surface of upper bar 187 on seal bar assembly 110. Also, intermittent gaps are provided between a top edge of upper bar 187 and shield 181.

Additionally, tube mount bar 198, according to one construction, is formed from extruded aluminum. As shown in FIG. 7, bar 198 has inwardly joining fingers that require a slight deformation of tube 200 when inserting and urging tube 200 such that tube 200 locks within a corresponding U-shaped groove within tube mount bar 198. As a topmost edge of tube 200 wears, it has been found that tube 200 can be removed, reoriented, and reinserted so as to present a new, fresh topmost portion by slightly rotating the configuration of the tube before reinserting tube 200. Accordingly, tube 200 can be used for extended periods of time so as to distribute contact wear around the circumference of tube 200. Also according to one construction, seal bar 194 is formed from hard anodized aluminum onto which a Teflon® coating has been provided, particularly in the region of nip 113. Alternatively, seal bar 194 can be formed from steel and further coated with a high-temperature dry film lubricant. Even further according to one construction, heater rods 186 each comprise a wattage fire rod that is ⅜ inch in diameter, 12 inches in length, 240 volts and 1,500 watts. One such heater rod is sold as a fire rod by Watlow, Part No. E70-G13E-8884, available from Watlow, 1310 Kingsland Drive, Batavia, Ill. 60510. Other configurations of resistance heaters can also be used to heat a seal bar, according to techniques presently understood in the air.

Instead of coating seal 194 with Teflon® (a trademark of E.I. DuPont de Nemours and Company, of Wilmington, Del.), an alternative construction uses a chromium nitrate coating on an anodized aluminum seal bar.

FIG. 8 illustrates the further moving together of upper seal bar assembly 88 and lower seal bar assembly 90 later in time than that depicted in FIG. 7. FIG. 8 further illustrates the positioning of seal bar assemblies 110 and seal bar substrate assembly 112 subsequent in time to the positions depicted in FIG. 7. More particularly, clamp plates 114, 116 and 118, 120 are shown engaged together so as to clamp and entrap folded film 25 therebetween. The segment of folded film 25 which is entrapped between seals 146, 147 and 148, 149, respectively, is somewhat taut, which improves the ability to seal and sever the folded film by co-action between heated seal bar 94 and pneumatically pressurized tube 200 co-acting on opposite sides of folded film 25. The tension helps pull apart, or sever, the two formed bag edges.

As shown in FIG. 8, folded film 25 is clamped and ready to be sealed and severed by seal bar 194 which is heated via heater rods 146.

Figure 9:
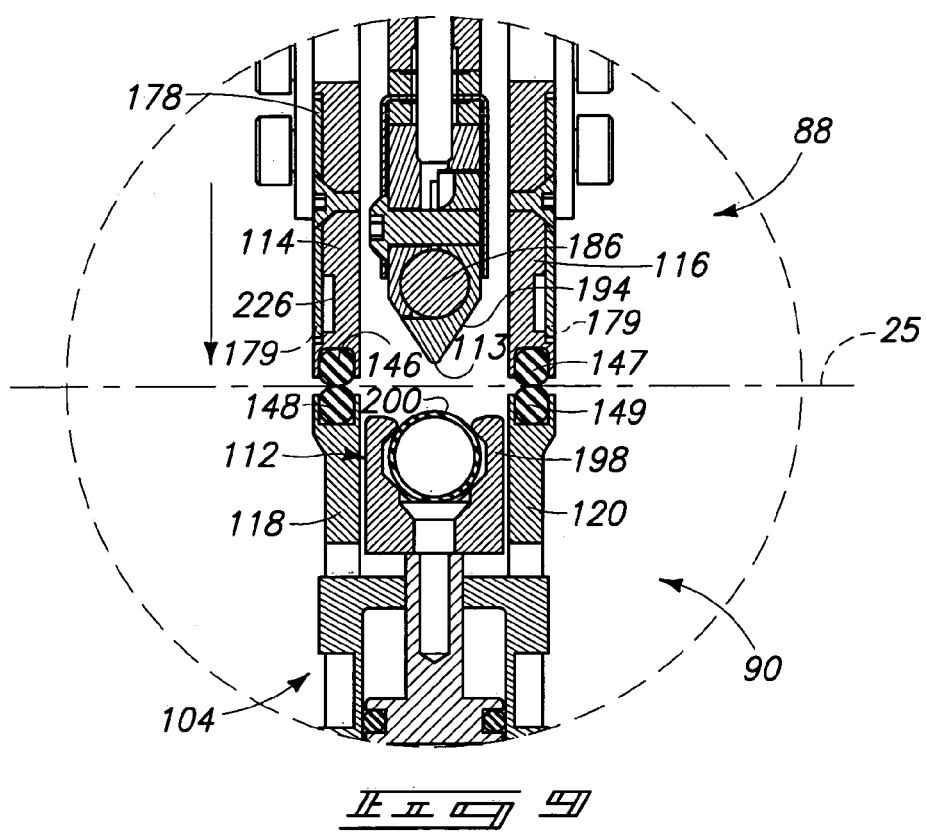
FIG. 9 is a vertical sectional view taken within the encircled region 8 of FIG. 6, but corresponding later in time than FIG. 8, and depicting the encircled region when the upper and lower clamp plates are engaged and the seal bar is driven to a lower position relative to the anvil as the upper clamp plates are compressively urged against their respective supporting springs.

FIG. 9 illustrates the further movement together between upper seal bar assembly 88 and lower seal bar assembly 90. More particularly, seals 146, 147 and 148, 149, respectively, remain engaged as clamp plates 114, 116 and 118, 120 remain engaged together through the force of springs 106 and 107 (see FIG. 3). Such springs enable retraction of plates 114 and 116, while such plates maintain contact with plates 118 and 120, respectively, and while also enabling further downward displacement of seal bar 194.

Figure 10:
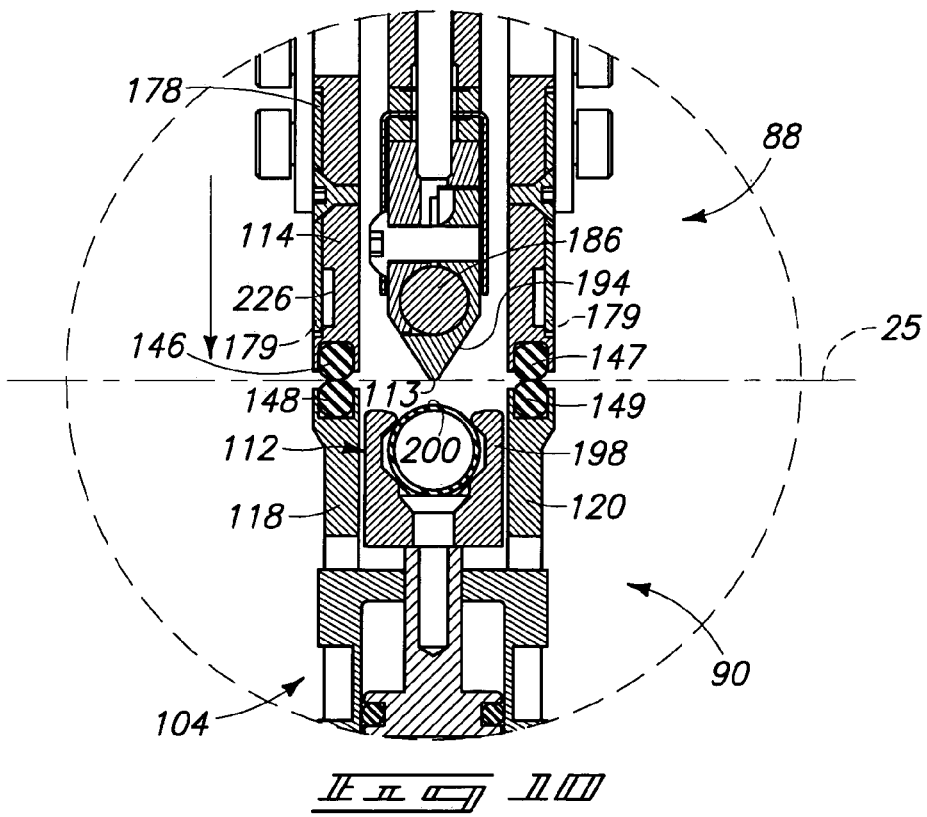
FIG. 10 is a vertical sectional view taken within the encircled region 8 of FIG. 6, but corresponding later in time than FIG. 9, to illustrate the bottom-most positioning of the seal bar where the upper clamp plates have maximally compressed the supporting springs, but before upwardly urging the anvil into contact with the seal bar.

As shown in FIG. 10, the positioning of upper seal bar assembly 88 and lower seal bar assembly 90 depicts the closest positioning between assemblies 88 and 90 corresponding with the positioning of crank arms 72-75 (as shown in FIG. 4). In such position, nip 113 of seal bar 194 touches folded film 25, while seals 146, 147 and 148, 149, respectively, still retain folded film 25 taut therebetween. However, seal bar substrate assembly 112 is still depicted in a retracted, or lowered, position such that pneumatically pressurized tube 200 has not yet engaged with nip 113. As will be described below with reference to FIGS. 11-12, tube 200 is subsequently raised to seal and sever folded film 25 between nip 113 and tube 200.

According to an alternative construction, seals 146, 147 and 148, 149, respectively, clamp folded film 25, after which seal bar 194 is driven further downwardly into folded film 25 (by constructing seal bar 194 with a deeper configuration). According to this alternative construction, seal bar substrate assembly 112 is completely eliminated (including tube 200). Instead, nip 113 is forced downwardly through the clamped segment of folded film 25 such that nip 113 heats, seals and severs the folded film therebetween.

Figure 11:
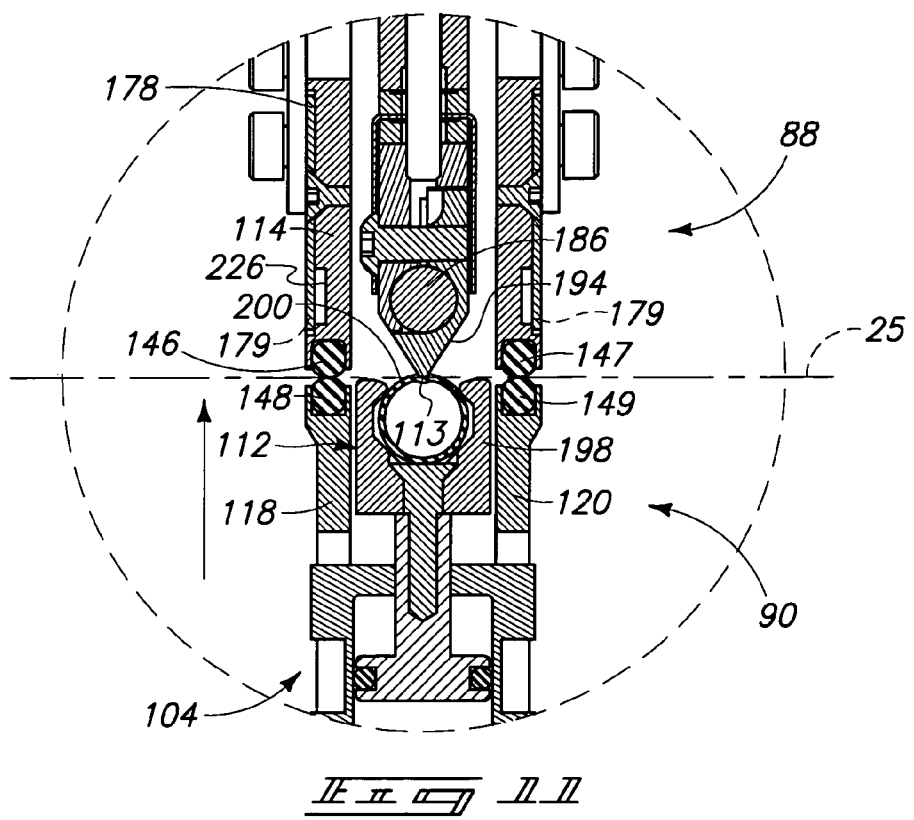
FIG. 11 is a vertical sectional view taken within the encircled region 8 of FIG. 6, but taken slightly later in time than FIG. 10, and illustrating maximal upward displacement of the anvil and the tube into engagement with the seal bar to seal and sever plastic material therebetween by way of upwardly urging the anvil via a plurality of pneumatic cylinders.

FIG. 11 illustrates the positioning of upper seal bar assembly 88 and lower seal bar assembly 90 corresponding in time just after the position depicted in FIG. 10, but showing seal bar substrate assembly 112 being driven upwardly via pneumatic cylinders, such as pneumatic cylinder 104. Accordingly, tube 200 and tube mount bar 198 are driven upwardly so as to press folded film 25 between tube 200 and seal bar 194 such that nip 113 on seal bar 194 resiliently urges and compresses a top edge of tube 200. Such operation begins to seal folded film 25 along either side of nip 113.

Figure 12:
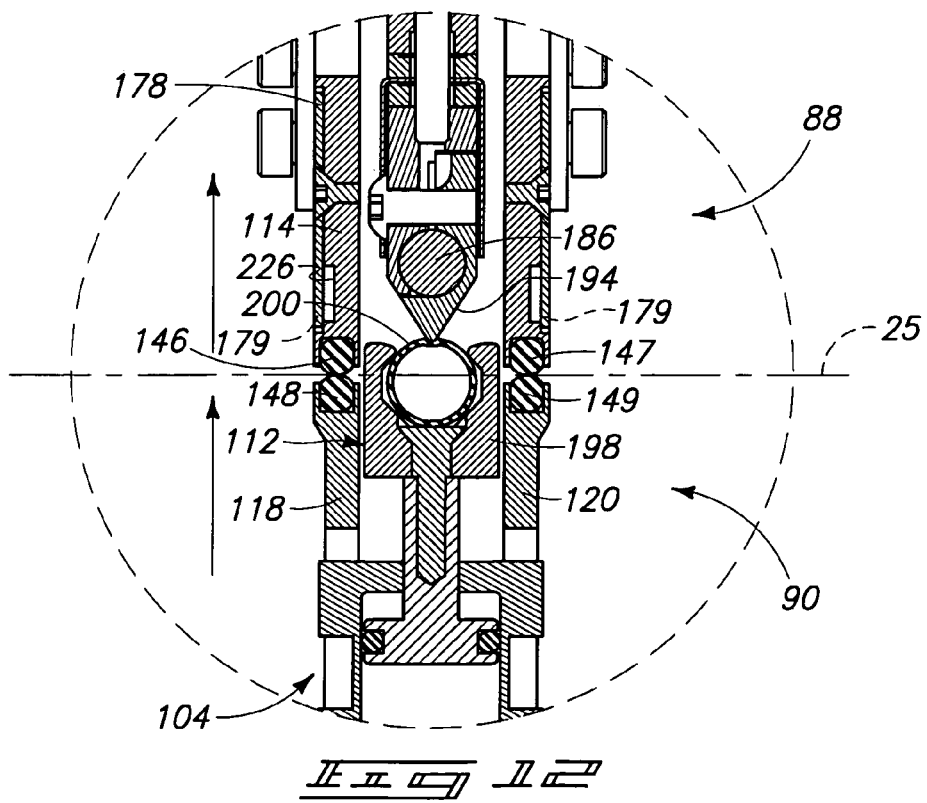
FIG. 12 is a vertical sectional view taken within the encircled region 8 of FIG. 6, but corresponding later in time than FIG. 11, and illustrating maximal upward displacement of the anvil with the seal bar so as to upwardly further urge the seal bar during sealing and severing of a folded thermoformable web therebetween.

FIG. 12 illustrates the positioning of upper seal bar assembly 88 and lower seal bar assembly 90 slightly later in time than that depicted in FIG. 11 where seal bar substrate assembly 112 is driven further upwardly via cylinder 104 corresponding with a position where assemblies 88 and 90 are moving away from each other. Seal bar 194 is slightly elevated, but tube 200 has been raised even further to continue urgable contact between seal bar 194 and tube 200. The pneumatically pressurized tube 200 is shown still slightly deformed in the FIG. 12 position which serves to further displace the film so as to assist in severing the sealed edges as they are drawn up from clamping action between seals 146, 148 and 147, 149. Accordingly, sealing and severing is carried out therebetween.

Figure 13:
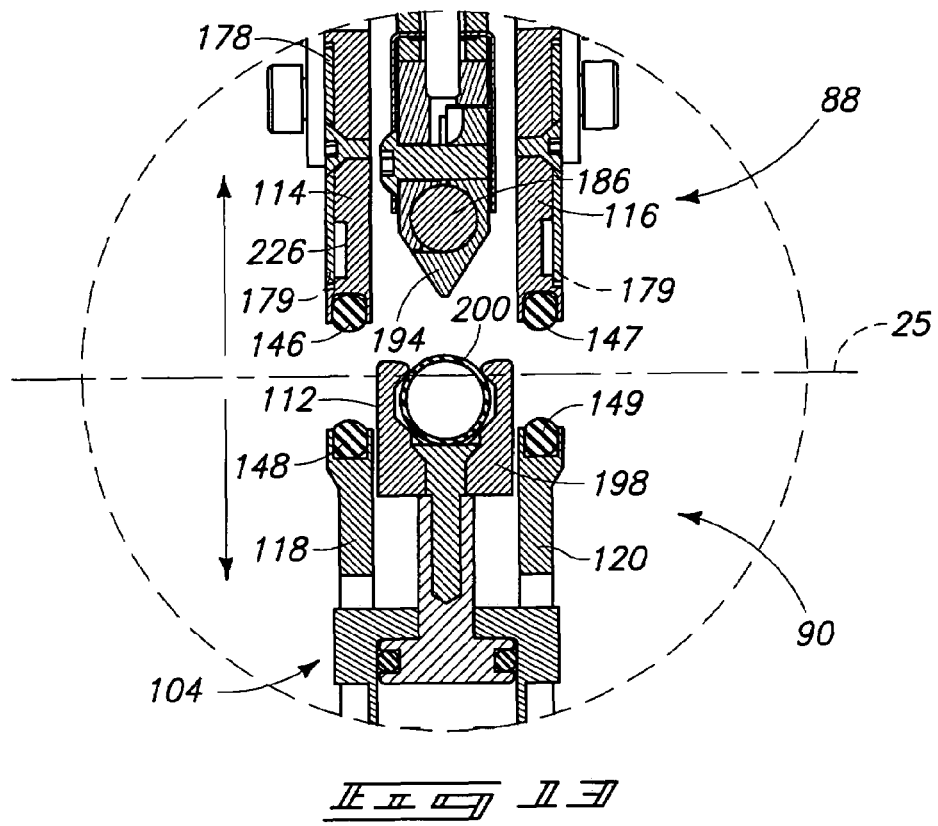
FIG. 13 is a vertical sectional view taken within the encircled region 8 of FIG. 6, but corresponding later in time than FIG. 12, and illustrating separation of the upper and lower clamp plates and retraction of the seal bar upwardly.

FIG. 13 illustrates positioning of upper seal bar assembly 88 and lower seal bar assembly 90 even later in time than that depicted in FIG. 12 where such assemblies 88 and 90 are being drawn further apart. Clamp plates 114, 116 and 118, 120 are now being drawn apart such that seals 146,147 and 148,149, respectively, are now separated. However, cylinder 140 has not been retracted such that seal bar assembly 112 and tube 200 are still at a maximally elevated position.

Figure 14:
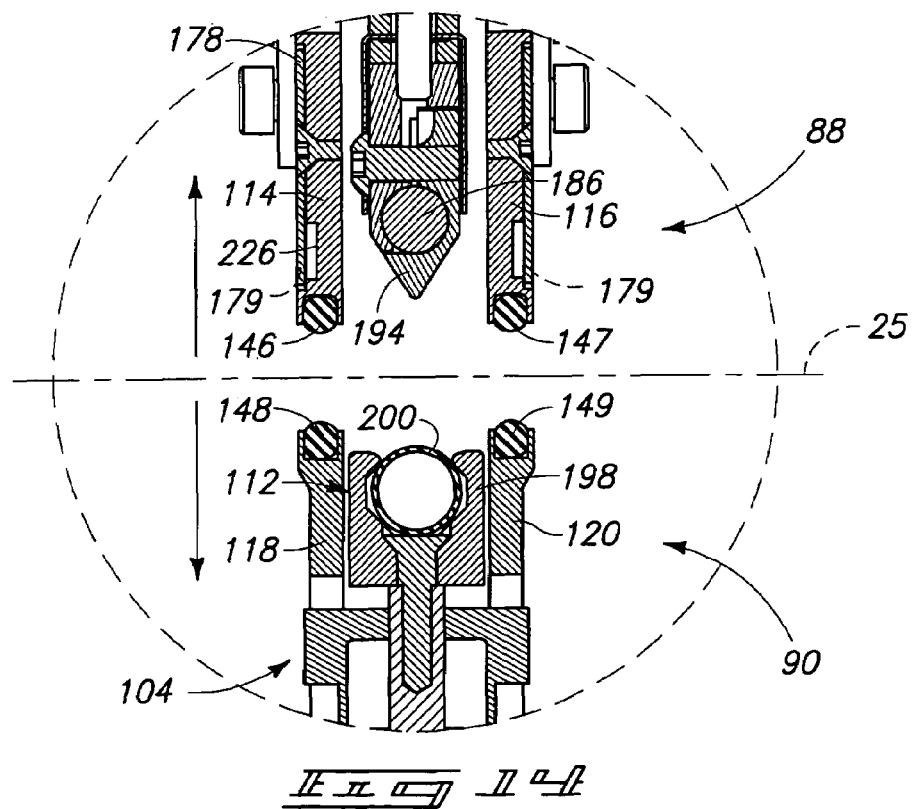
FIG. 14 is a vertical sectional view taken within the encircled region 8 of FIG. 6, but corresponding later in time than FIG. 13, and illustrating continued retraction of the upper and lower clamp plates and the seal bar and anvil which continue to move even further apart between successive severing operations so as to enable clearance and advancement of a web and articles therebetween.

FIG. 14 illustrates positioning of upper seal bar assembly 88 and lower seal bar assembly 90 as such assemblies 88 and 90 are drawn even further apart than that depicted in FIG. 13. According to such depiction, cylinder 104 has been retracted so as to lower seal bar substrate assembly 112 into tube 200. Although not shown herein, it is understood that assemblies 88 and 98 move yet even further apart so as to provide for intermittent advancement of articles and folded film 25 between assemblies 88 and 90 so as to present another segment of folded film 25 which is provided between adjacent stacks of articles, for forming, sealing and severing bag edges on either side of seal bar 194.

According to the steps depicted in FIGS. 7-14, a nip on a seal bar is urged into engagement with a pneumatically filled and resilient substrate provided by a pneumatically filled tube. The tube is deformed as a heated seal bar is driven, with folded film interposed therebetween, into the tube to seal a bag edge on either side of the nip of the seal bar, and to sever the folded film along the center edge of the seal bar. Accordingly, a pair of bag edges are formed in the film on either side, where the folded film is also separated between the formed pair of bag edges. The tube compresses slightly during forming and severing which imparts more uniform pressure between the heated nip of the seal bar and the tube along the entire length of the seal bar.

FIGS. 15-24 illustrate an optionally constructed seal bar substrate assembly 1112 that can be substituted for seal bar substrate assembly 112 in FIGS. 1-14. More particularly, seal bar substrate assembly 1112 is constructed in a manner that is virtually identical to seal bar substrate assembly 112 (of FIGS. 1-14) except that an anvil repositioning system 240 is provided for repositioning polytetrafluorethylene tube 1200 so as to rotate tube 1200 within tube mount bar 198. Anvil repositioning system 240 enables rotation of tube 1200 between successive sealing and severing operations which prevents wear along a single contact length of tube 1200 by rotating tube 1200 so as to expose an entire outer surface of tube 1200 to wear as the seal bar is engaged against tube 1200 during operation. Additionally, rotation of tube 1200 helps clean and dissipate the buildup of melted plastic material along tube 1200 that results from severing and sealing of bags thereagainst.

Figure 15:
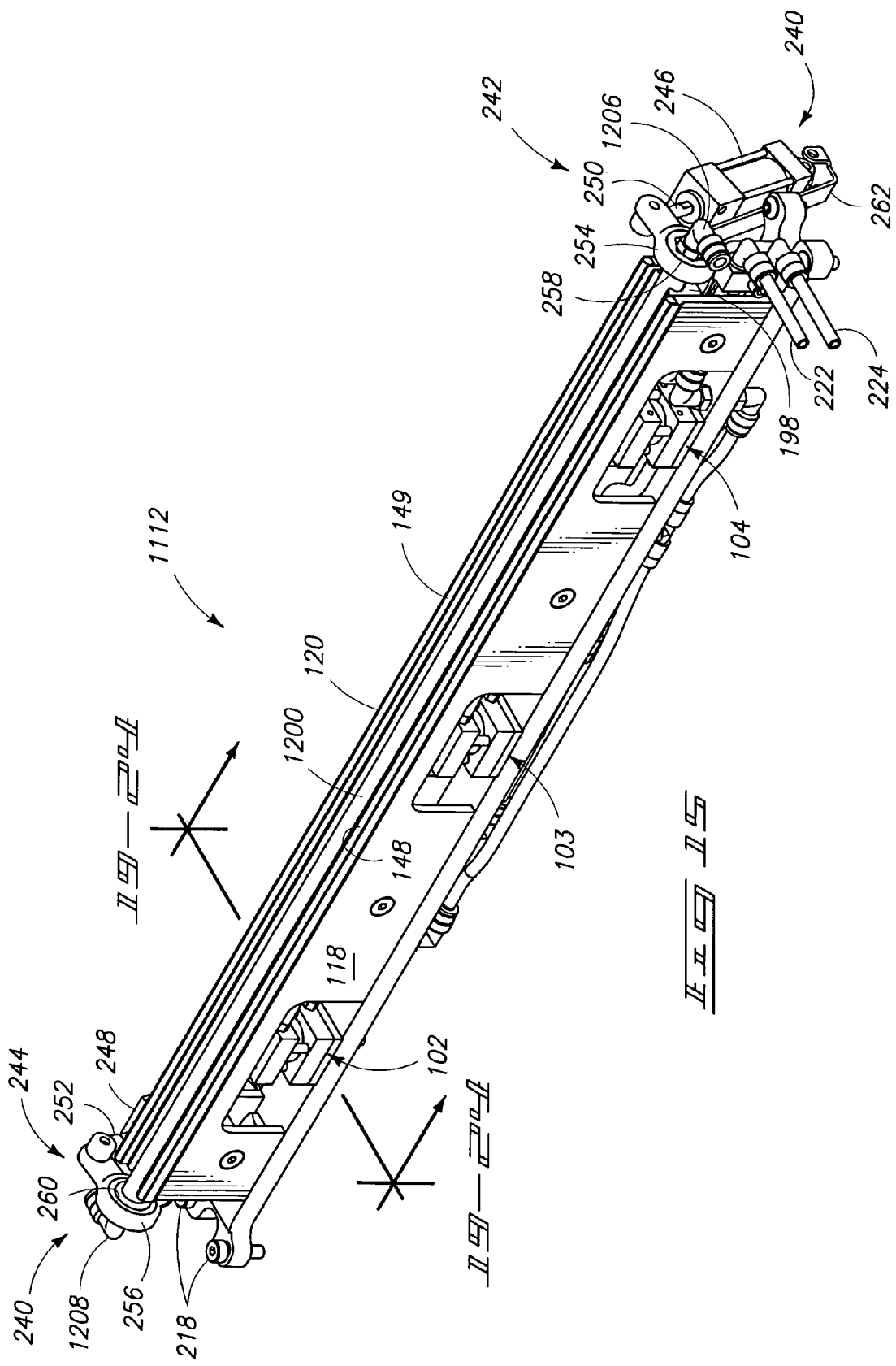
FIG. 15 an enlarged, component perspective view for an alternatively constructed lower seal bar assembly including an anvil in the form of a compliant tube and an anvil repositioning system for rotating a pneumatic tube of the anvil.

As shown in FIG. 15, anvil repositioning system 240, according to one construction, includes a pair of pneumatic actuator assemblies 242 and 244 provided at opposite ends of tube 1200. Actuator assembly 242 includes a pneumatic cylinder 246 with an axially extendable and retractable piston rod 250 that is configured to drive a ratchet arm 254. According to one construction, pneumatic cylinders 246 and 248 each comprise a Schrader Bellows double-acting air cylinder, Model No. 3/4-UTTU-36C×1, 3/4-inch bore×1-inch stroke air cylinder with a cap end cushion. Such air cylinder is sold by Schrader Bellows Cylinders, of Des Plaines, Ill., a division of Parker Hannifin Corporation. Ratchet arm 254 includes a built-in, internal ratchet 258 that has an inner hexagonal bearing surface that mates with a hexagonal nut provided on end fitting 1207 (see FIG. 17) on one end of tube 1200. Ratchet 258 engages the bearing surface as arm 254 is rotated up, and releases the bearing surface as arm 254 is rotated down. Similarly, actuator assembly 244 includes a pneumatic cylinder 248 having an extendable and retractable piston rod 252 configured to pivotally mate with and drive a ratchet arm 256. Ratchet arm 256 also includes a ratchet 260 having an inner hexagonal surface that mates with a complementary, corresponding hexagonal end fitting 1209 (see FIG. 18) on an opposite end of tube 1200.

Each of ratchets 258 and 268 can be reversibly configured so as to provide engagement with end fittings 1207 (see FIG. 17) and 1209 (see FIG. 18) so as to rotate tube 1200 as pneumatic cylinders 246 and 248 are axially extended. Retraction of pneumatic cylinders 246 and 248 in an opposite direction allows the ratchets to return without counter-rotating tube 1200. Optionally, the ratchets 258 and 260 can be reversibly set so that retraction of pneumatic cylinders 246 and 248 will rotate tube 1200, whereas extension of pneumatic cylinders 246 and 248 will disengage from the drive surface and ratchet back, thereby not counter-rotating tube 1200.

As shown in FIGS. 15 and 16, actuator assemblies 242 and 244 each include a respective metal mounting bracket 262 and 264. Mounting brackets 262 and 264 are each affixed to an underside end of tube mount bar 198 using a plurality of 8/32-inch button head (low profile) socket head fasteners (such as fasteners 262 in FIG. 17). Accordingly, actuator assemblies 242 and 244 move up and down with bar 198 by way of extension and retraction of pneumatic cylinders 102-104. Accordingly, ratchets 258 and 260 are not actuated merely by upward and downward movement of bar 198 during a sealing and severing operation. However, pneumatic cylinders 246 and 248 can be independently actuated (preferably when tube 1200 is not engaged with a seal bar) in order to rotate tube 1200 to present a new contact surface for engagement with a seal bar during a sealing and severing operation.

As shown in FIGS. 15 and 16, end fittings 1206 and 1208 provide a rotatable seal with respective end fittings 1207 (see FIG. 17) and 1209 (see FIG. 18) on tube 1200 to enable rotation of tube 1200 via actuation of anvil repositioning system 240.

According to one construction, ratchets 258 and 260 are mounted for one-way rotation within respective ratchet arms 254 and 256. Ratchets 258 and 260 are each set to allow rotation of tube 1200 in one direction, between successive severing and sealing operations. One suitable source for ratchet arms 254, 256 and respective ratchets 258, 260 is provided by modifying an existing reversible ratcheting combination wrench by machining off a handle on such a commercially available wrench and drilling a hole in the machine handle to receive a respective female rod and swivel bar connector, such as connector 268 in FIG. 17. One suitable commercially available reversible ratcheting combination wrench is sold under the federally registered trademark Crescent® by Cooper Tools of Apex, N.C., as a Model No. FRR14 7/16-inch ratcheting wrench. Such a wrench has a reversible ratcheting feature that enables reversing the direction of ratchet. However, other ratcheting constructions and wrenches could be utilized to provide for arms 254, 256 and ratchets 258, 260.

As shown in FIG. 17, extension of rod 250 via cylinder 246 rotates ratchet arm 254 upwardly, which rotates end fitting 1207 along with the respective tube. Likewise, upward extension of rod 252 via cylinder 248 in FIG. 18 engages end fitting 1209 to concurrently rotate tube 1200. Retraction of rods 250 (of FIG. 17) and rod 252 (of FIG. 18) releases mechanical engagement to provide for a ratchet return that does not counter-rotate the respective tube.

Figure 20:
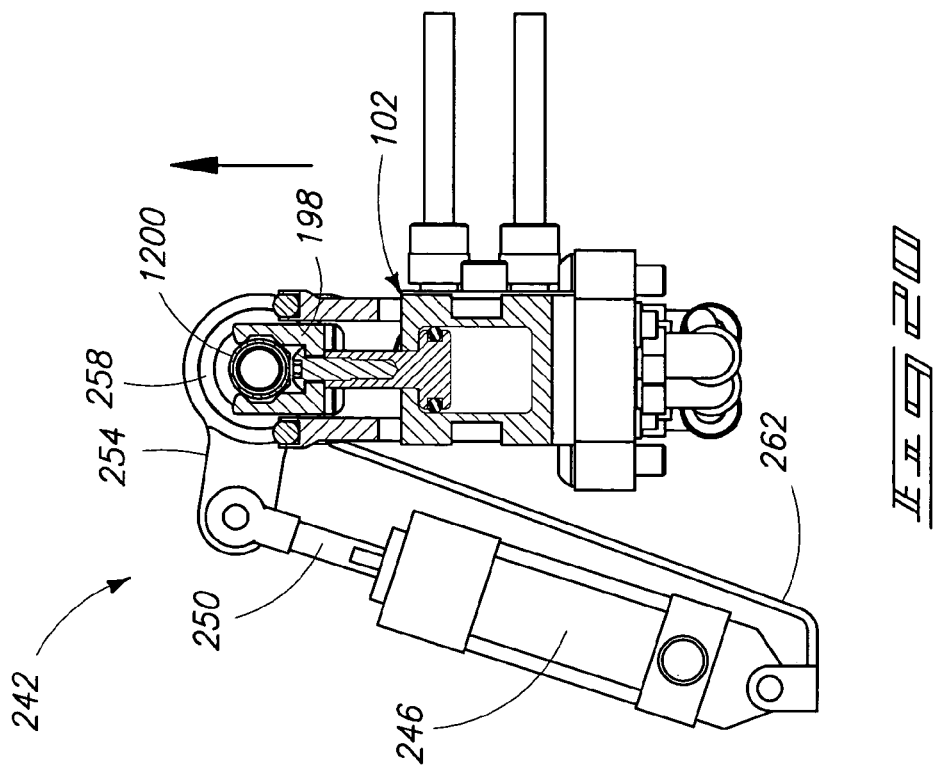
FIG. 20 is a vertical sectional view taken along line 20-20 of FIG. 15 depicting the tube of the lower seal bar assembly extended to a highest vertical position.
Figure 19:
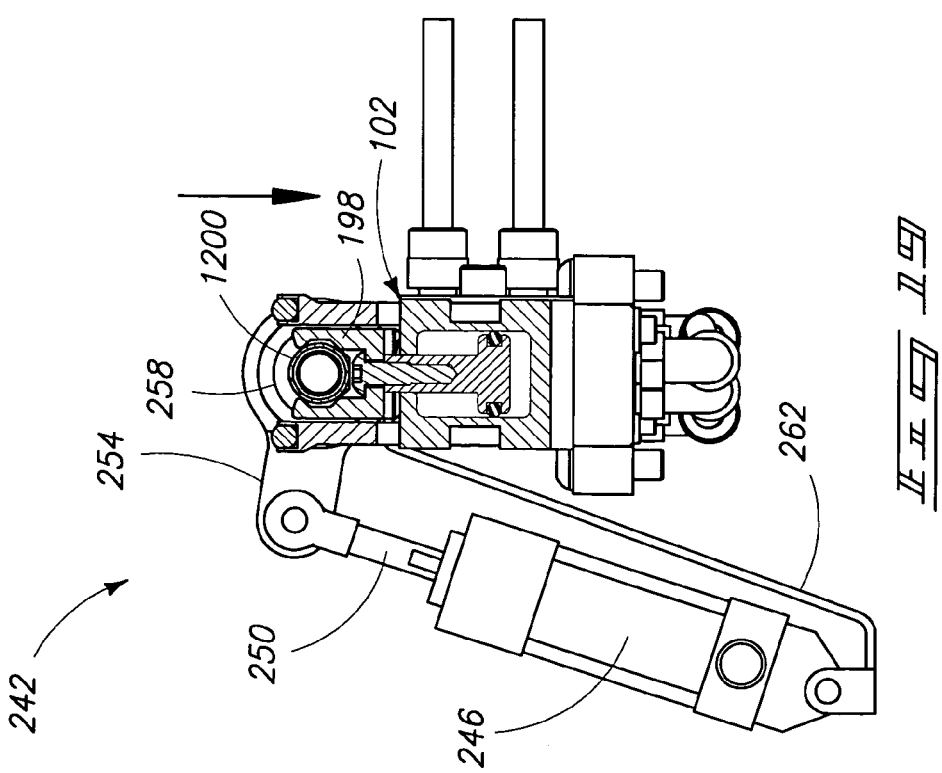
FIG. 19 is a vertical sectional view taken along line 19-19 of FIG. 15 depicting the tube of the lower seal bar assembly retracted to a lowest vertical position.

FIGS. 19 and 20 illustrate the lowermost positions and uppermost positions for tube mount bar 198 and tube 1200, respectively. FIG. 19 illustrates bar 198 and tube 1200 when placed in a lowest-most position. Likewise, FIG. 20 illustrates bar 198 and tube 1200 raised to their highest-most position, coinciding with a sealing and severing operation while engaged against a seal bar (not shown).

As illustrated in FIGS. 19 and 20, mounting bracket 262 raises with bar 198 to carry actuator assembly 242 between the lowered and raised positions while preventing any articulation or movement of ratchet arm 254 and respective ratchet 258.

Figure 21:
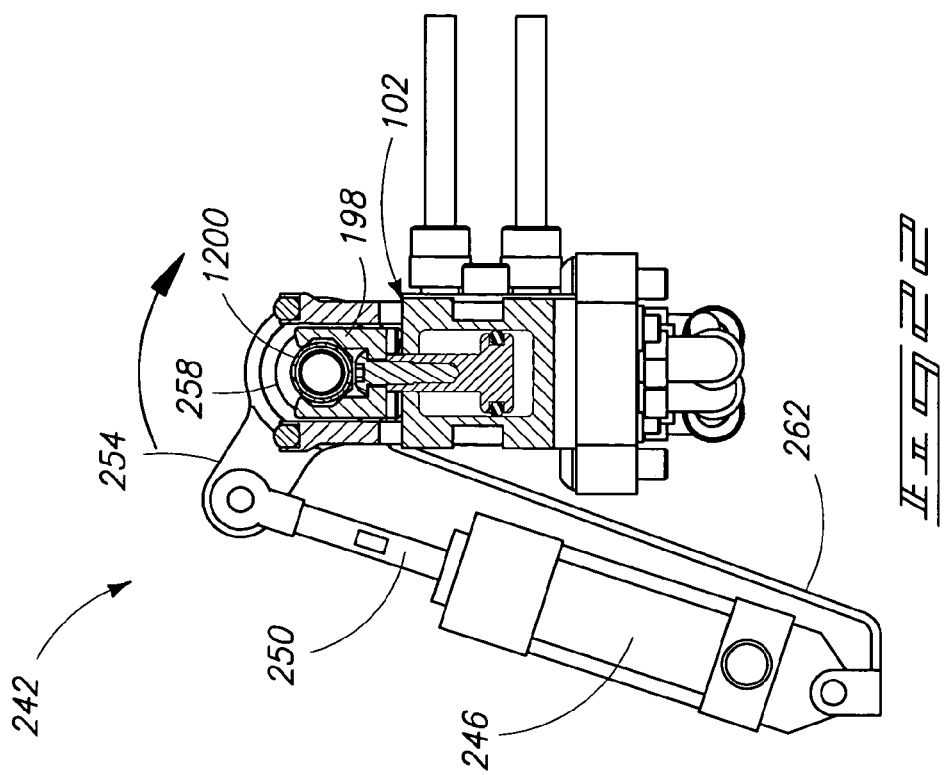
FIG. 21 is a vertical sectional view taken along line 21-21 of FIG. 15 depicting the tube of the lower seal bar assembly in the lowest vertical position and prior to rotating the tube with the anvil repositioning system.

FIG. 21 illustrates the lowest position of bar 198 and tube 1200 corresponding with the same position depicted in FIG. 19. However, the position depicted in FIG. 21 corresponds with the initial position of bar 198 and tube 1200 prior to repositioning tube 1200 progressively in time while rotating tube 1200 through the positions shown in FIGS. 22-24 via actuation of actuator assembly 242 (as well as actuator assembly 244 of FIGS. 15 and 16).

Figure 22:
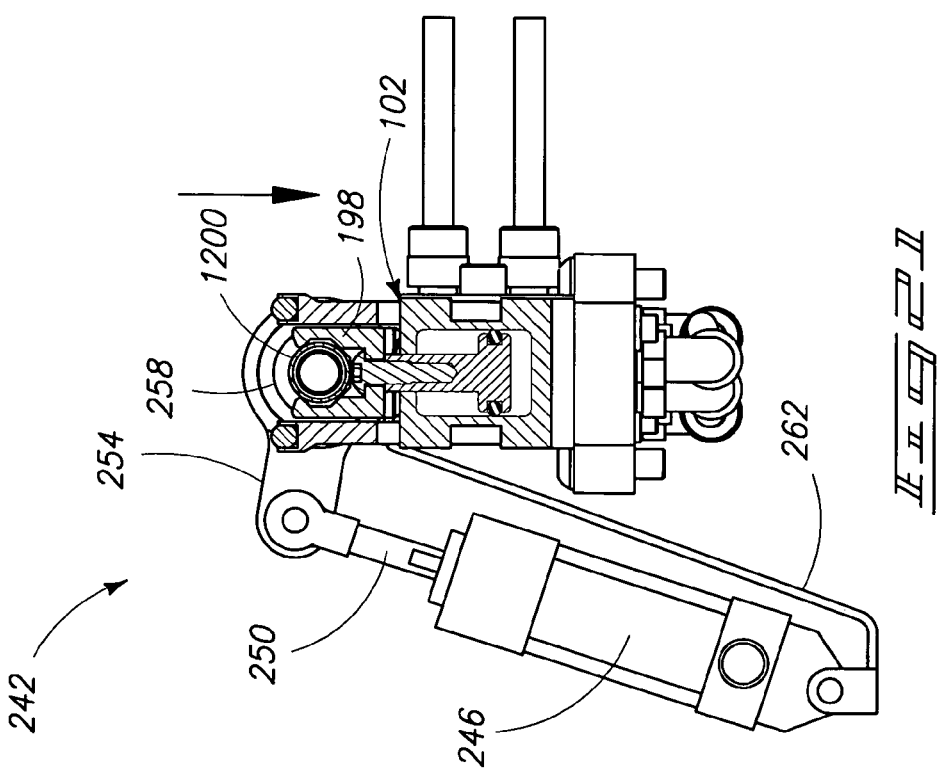
FIG. 22 is a vertical sectional view taken along line 22-22 of FIG. 15 depicting the tube of the lower seal bar assembly later in time than depicted in FIG. 21 and rotated halfway by extension of air cylinders of the anvil repositioning system relative to the position depicted in FIG. 21.

FIG. 22 illustrates partial actuation of cylinder 246 so as to partially extend rod 250 and rotate ratchet arm 254, which imparts a concomitant rotation to tube 1200.

Figure 23:
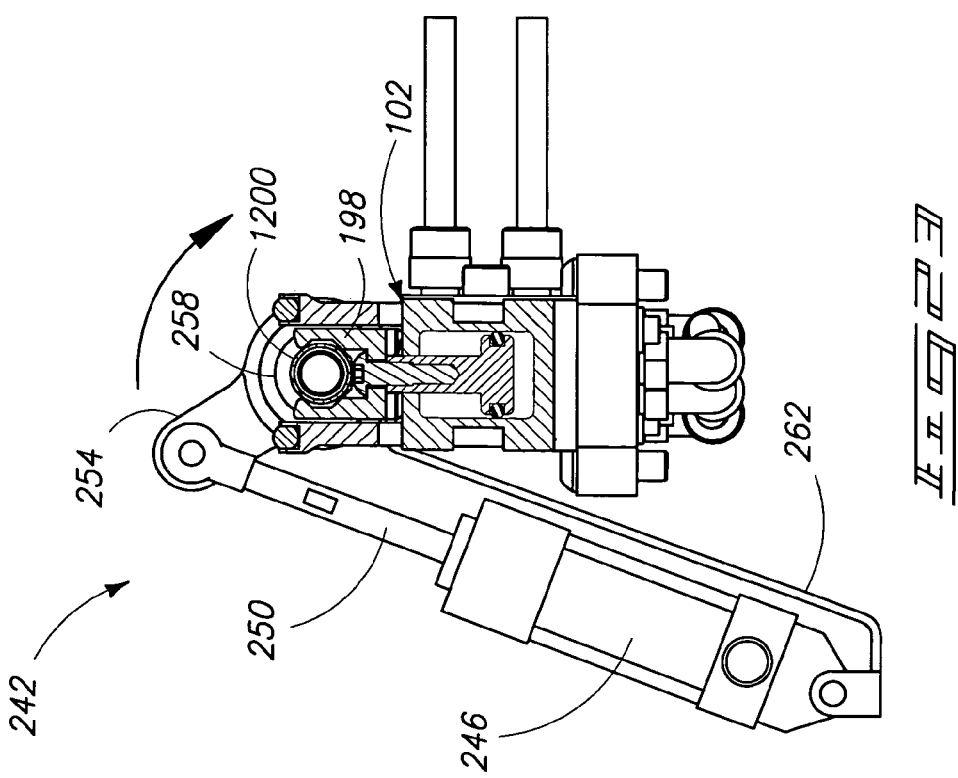
FIG. 23 is a vertical sectional view taken along line 23-23 of FIG. 15 depicting the tube of the lower seal bar assembly later in time than depicted in FIG. 22 and rotated fully by further extension of air cylinders of the anvil repositioning system relative to the position depicted in FIG. 22.

FIG. 23 illustrates even further extension of pneumatic cylinder 246 so as to further extend piston rod 252 to a fully extended position, which drives ratchet arm 254 to a fully rotated position along with tube 1200.

Figure 24:
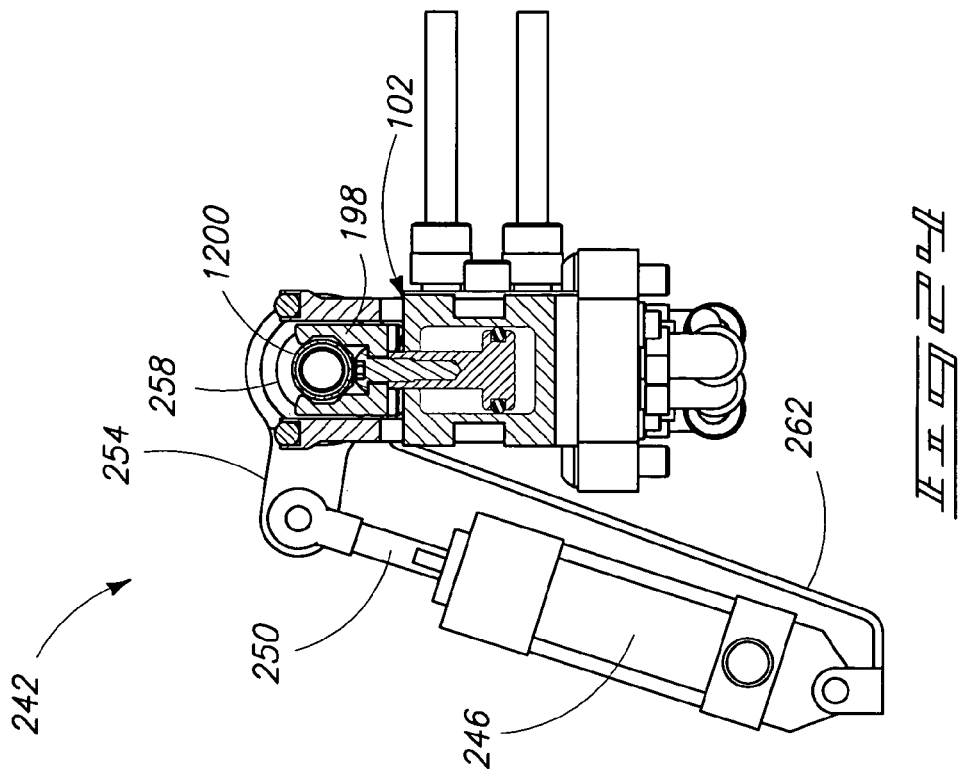
FIG. 24 is a vertical sectional view taken along line 24-24 of FIG. 15 depicting the tube of the lower seal bar assembly later in time than depicted in FIG. 22 and with the air cylinders of the anvil repositioning system retracted without rotating the tube.

FIG. 24 illustrates the complete retraction of pneumatic cylinder 246 which retracts piston rod 250 along with ratchet arm 254. As ratchet arm 254 is rotated in a leftward direction and retracted, the ratcheting mechanism within ratchet 258 releases the drive surface and allows return of arm 254 while preventing counter-rotation of tube 1200 which was previously rotated forward from the initial position presented in FIG. 21.

Accordingly, an actuator is provided that communicates with bar 198 and tube 1200 to reposition the exposed surface of tube 1200 in order to present a new contact portion on an outer peripheral surface of tube 1200 for engagement with a seal bar during a sealing and severing operation. In this case, tube 1200 cooperates with bar 198 to provide a resilient seal bar anvil that has an outer surface that can be repositioned by way of actuator assembly 242 (as well as actuator assembly 244 of FIGS. 15-16) to present a new contact portion (or surface) on the outer surface of tube 1200. The new contact portion will be changed with each cycle of operation by continually rotating tube 1200 between individual severing and sealing operations with a seal bar.

As shown in FIGS. 19-24, the upper seal bar assembly has been omitted and only significant portions of a lower seal bar assembly are depicted. However, it is understood that remaining portions of a bag seal machine are identical to those depicted in the device shown in FIGS. 1-14.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An apparatus for forming bag edges in a layered plastic film, comprising:
    a frame;
    a kinematic linkage supported by the frame;
    a pair of laterally spaced apart clamps carried for reciprocation by the kinematic linkage relative to the frame and configured to cooperatively clamp plastic film alone a clamp plane during sealing and severing;
    a heated seal bar carried for reciprocation by the kinematic linkage relative to the frame along a sealing plane between the clamps and substantially perpendicular to the clamp plane, the seal bar having a nip edge configured to seal and sever bag edges in layered plastic film; and
    a seal bar anvil carried for reciprocation by the kinematic linkage relative to the frame along the sealing plane, the seal bar anvil having a resilient tube configured to deform as the seal bar is driven into the tube to seal and sever a bag edge therebetween;
    wherein the kinematic linkage is operative to sequentially: 1) reciprocate the clamps to hold layered plastic film along the clamp plane, 2) reciprocate the seal bar and the anvil into forcible engagement with opposed faces of the layered plastic film, and 3) reciprocate the anvil and the seal bar to move the seal bar beyond the clamp plane so as to stretch the film away from the clamp plane during further sealing and severing.

2. The apparatus of claim 1 wherein the seal bar has an elongate nip, and wherein the resilient, elongate tube provides a resilient substrate face and is configured to mate in engagement with the elongate nip of the heated seal bar to seal and sever a bag edge therebetween.

3. The apparatus of claim 1 wherein the tube comprises a polytetrafluoroethylene tube.

4. The apparatus of claim 1 wherein the resilient tube includes an inlet and an outlet configured to provide a fluid flow heat sink, wherein the tube is hollow and further comprises an inlet fitting configured to receive a supply of pressurized gas within the tube, and wherein the supply of pressurized gas is provided at a predetermined pressure that internally pressurizes the tube to impart a stiffness to the tube so as to enable adjustment of resilience of the tube by adjusting the pressure.

5. The apparatus of claim 4 wherein the gas comprises compressed air.

6. The apparatus of claim 5 further comprising an outlet fitting on the tube, the inlet fitting configured to receive a supply of pressurized air into the tube and the outlet fitting configured to release the supply of pressurized air from the tube.

7. The apparatus of claim 6 further comprising a clamp for affixing plastic film adjacent the seal bar and the seal bar anvil.

8. The apparatus of claim 7 wherein the clamp further comprises at least one outlet nozzle adjacent a clamp surface of the clamp communicating with the outlet nozzle of the tube for delivering air from the nozzle onto the clamp face to cool the clamp face.

9. The apparatus of claim 4 wherein the tube is coupled with a temperature-regulating fluid circuit configured to deliver compressible, temperature-regulated fluid through the tube.

10. The apparatus of claim 9 wherein the temperature-regulating fluid circuit delivers a supply of pneumatic air that is lower than the temperature of the heated seal bar in order to cool the tube to enhance sealing and severing of a bag edge between the heated seal bar and the cooled seal bar tube.

11. The apparatus of claim 10 wherein the tube comprises a friction-reducing material.

12. The apparatus of claim 11 wherein the friction-reducing material is polytetrafluoroethylene.

13. The apparatus of claim 1 wherein the seal bar and the seal bar anvil are carried at opposite ends by parallel die posts and further comprising an upper pair of crank arms and a lower pair of crank arms configured to move the seal bar and the seal bar anvil together and apart during bag edge formation and advancement of the plastic film, respectively.

14. The apparatus of claim 13 further comprising vertical actuators configured to urge the resilient tube into engagement with the heated seal bar during a sealing and severing operation.

15. The apparatus of claim 14 wherein the actuators comprise a plurality of pneumatic cylinders provided beneath the seal bar anvil.

16. The apparatus of claim 1 wherein the seal bar anvil comprises a tube mount bar and a polytetrafluoroethylene tube carried within the tube mount bar.

17. The apparatus of claim 16 wherein the clamps comprise a pair of laterally spaced-apart upper clamp plates provided on either side of the seal bar and a pair of laterally spaced-apart, lower clamp plates provided on either side of the tube mount bar, wherein one of the upper clamp plates and one of the lower clamp plates and another of the upper clamp plates and another of the lower clamp plates, respectively, engaged together to hold layered plastic film prior to sealing and severing between the seal bar and the seal bar anvil, and wherein each of the upper clamp plates includes a cooling manifold and outlet orifices communicating with the manifold and configured to receive a flow of cooling fluid to cool each upper clamp plate.

18. A heat seal apparatus, comprising:
a frame;
a kinematic linkage supported by the frame;
a pair of laterally spaced apart clamps carried for reciprocation by the kinematic linkage relative to the frame and configured to cooperatively clamp and unclamp plastic film along a clamp plane during sealing and severing;
a seal bar carried by the kinematic linkage between the pair of clamps for reciprocation along a sealing plane substantially perpendicular to the clamp plane and configured to be heated to seal and sever plastic film;
an anvil carried by the kinematic linkage for reciprocation along the sealing plane to engage and disengage with the seal bar, the anvil having a resilient, tubular outer wall portion; and
a cooling manifold provided in each of the clamps proximate the seal bar to cool the clamp proximate the seal bar as the seal bar generates heat;
wherein one of the seal bar and the anvil is supported for movement toward and away from the other of the seal bar and the anvil.

19. The heat seal apparatus of claim 18 wherein the seal bar comprises a thermal generator.

20. The heat seal apparatus of claim 19 wherein the thermal generator comprises at least one heater rod configured to heat the seal bar.

21. The heat seal apparatus of claim 19 wherein the anvil comprises a cylindrical tube of flexible, heat resistant material.

22. The heat seal apparatus of claim 21 wherein the cylindrical tube includes an inlet and an outlet for receiving and emitting, respectively, a flow of cooling fluid through the cylindrical tube.

23. The heat seal apparatus of claim 22 wherein the cooling fluid comprises compressed air.

24. A bag machine comprising:
a conveyor; and
a bag film sealing assembly including a frame, a kinematic linkage supported by the frame, a seal bar having a nip edge supported by the kinematic linkage for reciprocation along a sealing plane for sealing and severing overlapping bag films, an anvil supported by the kinematic linkage for reciprocation along the sealing plane, a pair of laterally spaced apart clamps provided on either side of the sealing plane, carried for reciprocation by the kinematic linkage relative to the frame, and configured to cooperatively clamp plastic film along a clamp plane during sealing and severing, and a temperature regulating fluid circuit providing a flow of pneumatic fluid, one of the seal bar and the anvil supported for movement toward and away from the other of the seal bar and the anvil, and the anvil including a resilient, tubular outer wall portion configured to communicate with the temperature regulating fluid circuit to provide a fluid flow heat sink via the pneumatic fluid.

25. The bag machine of claim 24 wherein the seal bar is heated.

26. The bag machine of claim 24 wherein the tubular outer wall portion of the anvil is provided by a resilient tube of heat resistant material.

27. The bag machine of claim 26 wherein the anvil comprises a polytetrafluoroethylene tube.

28. The bag machine of claim 26 wherein the tube is internally pressurized with compressed air.

29. The bag machine of claim 28 wherein the compressed air is circulated through the tube to cool the tube.

30. A bag edge forming apparatus, comprising:
a frame;
a kinematic linkage supported by the frame;
a pair of laterally spaced apart clamps carried for reciprocation by the kinematic linkage relative to the frame and configured to cooperatively clamp plastic film along a clam pp lane during sealing and severing;
a seal bar supported by the kinematic linkage for reciprocation along a sealing plane between the clamps and substantially perpendicular to the clamp plane and configured to generate heat for sealing and severing plastic film;
a fluid circuit configured to deliver a flow of cooling fluid through a portion of each of the clamps proximate the seal bar to reduce temperature of the clamps relative to the seal bar; and
a pneumatic anvil supported by the frame for reciprocation along the sealing plane;
wherein the kinematic linkage is configured to move one of the seal bar and the anvil relative to another of the seal bar and the anvil along the sealing plane to engage and disengage the seal bar and the anvil.

31. The apparatus of claim 30 wherein the seal bar comprises an electrical resistance heater rod mounted in thermal engagement with an elongate nip of the seal bar.

32. The apparatus of claim 30 wherein anvil comprises a flexible tube of heat resistant material configured to be internally pressurized with pneumatic fluid.

33. The apparatus of claim 32 wherein flexible tube comprises polytetrafluoroethylene.

34. The apparatus of claim 30 wherein the fluid circuit comprises a fluid manifold and a plurality of cooling channels configured to deliver a flow of cooling fluid through each of the clamps.

35. The apparatus of claim 34 wherein each of the seal bar clamps comprises at least one clamp plate adjacent the seal bar and at least one complementary, mating clamp plate adjacent the anvil, and wherein the manifold and the cooling channels are provided in the clamp plates adjacent the seal bar.

* * * * *

UNITED STATES PATENT AND TRADEMARK OFFICE
CERTIFICATE OF CORRECTION

PATENT NO. : 7,262,389 B2  Page 1 of 1
APPLICATION NO. : 10/869233
DATED : August 28, 2007
INVENTOR(S) : Jere F. Irwin It is certified that error appears in the above-identified patent and that said Letters Patent is hereby corrected as shown below:

Col. 3, line 41 -
  Replace "FIG. 15 an enlarged, component perspective view for an"
  With --FIG. 15 is an enlarged, component perspective view for an--

Col. 11, line 30 -
  Replace "a control system in order prevent operation or to re-time"
  With --a control system in order to prevent operation or to re-time--

Col. 20, line 32 -
  Replace "along a clam pp lane during sealing and severing;"
  With --along a clamp plane during sealing and severing;--

Signed and Sealed this

Fifth Day of August, 2008

JON W. DUDAS
*Director of the United States Patent and Trademark Office*